United States Patent
Facey et al.

(10) Patent No.: US 8,006,985 B2
(45) Date of Patent: Aug. 30, 2011

(54) TRANSPORTING LOADS

(75) Inventors: Hugh David Facey, Sheffield (GB); Derek Boaler, Sheffield (GB); John Makin, South Yorkshire (GB); Brian Edward Shawcross, Nottinghamshire (GB); Leigh Jowett, Sheffield (GB)

(73) Assignee: Loadhog Limited (GB)

( * ) Notice: Subject to any disclaimer, the term of this patent is extended or adjusted under 35 U.S.C. 154(b) by 418 days.

(21) Appl. No.: 12/376,543

(22) PCT Filed: Jun. 8, 2007

(86) PCT No.: PCT/GB2007/002117
§ 371 (c)(1),
(2), (4) Date: Mar. 16, 2009

(87) PCT Pub. No.: WO2008/017798
PCT Pub. Date: Feb. 14, 2008

(65) Prior Publication Data
US 2010/0187782 A1    Jul. 29, 2010

(30) Foreign Application Priority Data

Aug. 8, 2006 (GB) .................................. 0615707.7
Nov. 3, 2006 (GB) .................................. 0621920.8

(51) Int. Cl.
*B62D 33/08* (2006.01)
(52) U.S. Cl. ............... 280/43.14; 280/43.24; 280/47.41; 188/5
(58) Field of Classification Search .................. 280/43, 280/43.12, 43.13, 43.14, 43.17, 43.18, 43.22, 280/43.24, 79.11, 47.34, 47.41; 16/19, 32, 16/33, 34; 188/5, 6, 7, 8
See application file for complete search history.

(56) References Cited

U.S. PATENT DOCUMENTS

| 3,216,531 | A | 11/1965 | Hutchinson |
| 3,710,895 | A | 1/1973 | Freedman |
| 4,073,369 | A | 2/1978 | Nordskog |
| 4,526,253 | A * | 7/1985 | Schmidt ..................... 188/1.12 |
| 4,886,286 | A | 12/1989 | Whorton, III |
| 7,559,098 | B2 * | 7/2009 | He ............................. 5/81.1 R |
| 2003/0213878 | A1 | 11/2003 | Stahl |
| 2007/0186827 | A1 * | 8/2007 | Loftus et al. ............... 108/57.15 |

FOREIGN PATENT DOCUMENTS

| DE | 23 64 909 A1 | 7/1975 |
| DE | 198 09 331 C1 | 5/1999 |

(Continued)

*Primary Examiner* — John Walters
(74) *Attorney, Agent, or Firm* — Clark Hill PLC

(57) ABSTRACT

A load-carrying dolly having four wheels (6, 7) adjacent the corners of its platform (1) is rendered immobile by conversion to a pallet-like condition by lowering bearers (9, 10, 11) into contact with the floor or ground (24) and then raising the platform (1) slightly to raise the wheels (6, 7) clear of the floor or ground by means of either of two pedals (25, 32), one below each end of the platform (1), with linkage (of either of two forms, not shown) to bars (23) connecting in "slave" pairs of toggle links (20, 21) by means of which the bearers are suspended through beams (33) connecting upward extensions (12, 13, 14) at the ends of the bearers (9, 10, 11), the toggle links in each pair becoming locked by mating abutments (28) coming together when the links have passed slightly beyond in-line position, the mechanical advantage of the depressed pedal (25 or 32) being amplified by that of the pairs of toggle links when passing through in-line positions.

24 Claims, 22 Drawing Sheets

FOREIGN PATENT DOCUMENTS

| | | |
|---|---|---|
| EP | 0 487 147 A1 | 5/1992 |
| EP | 0 666 209 A1 | 8/1995 |
| EP | 1 176 079 A2 | 1/2002 |
| WO | 2004/080780 A1 | 9/2004 |

* cited by examiner

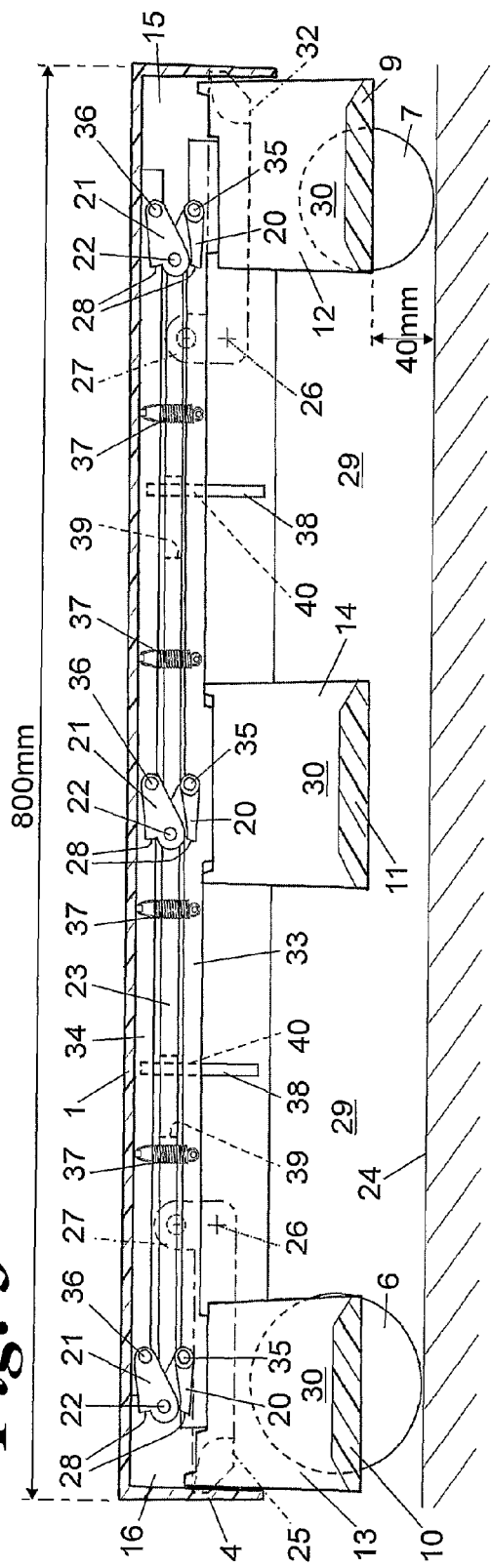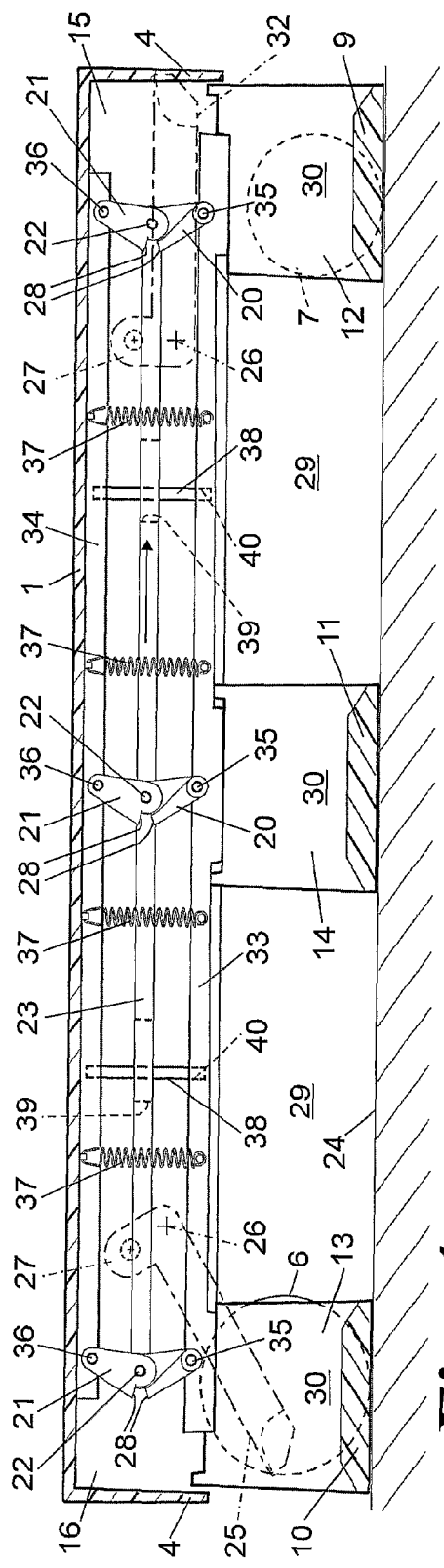

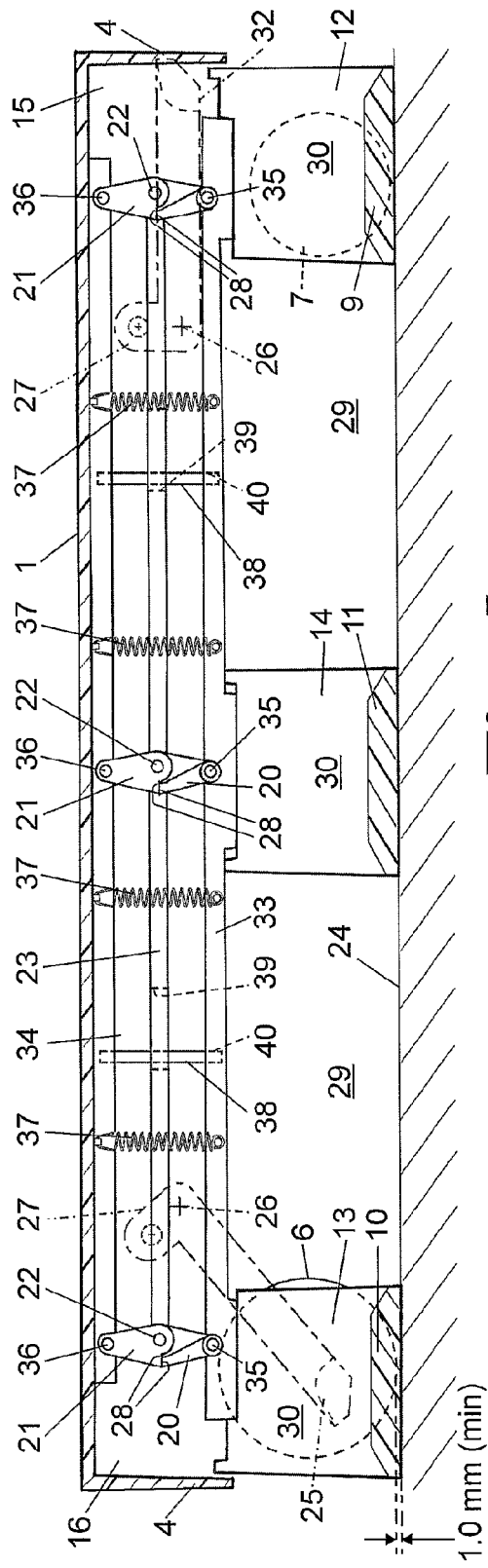
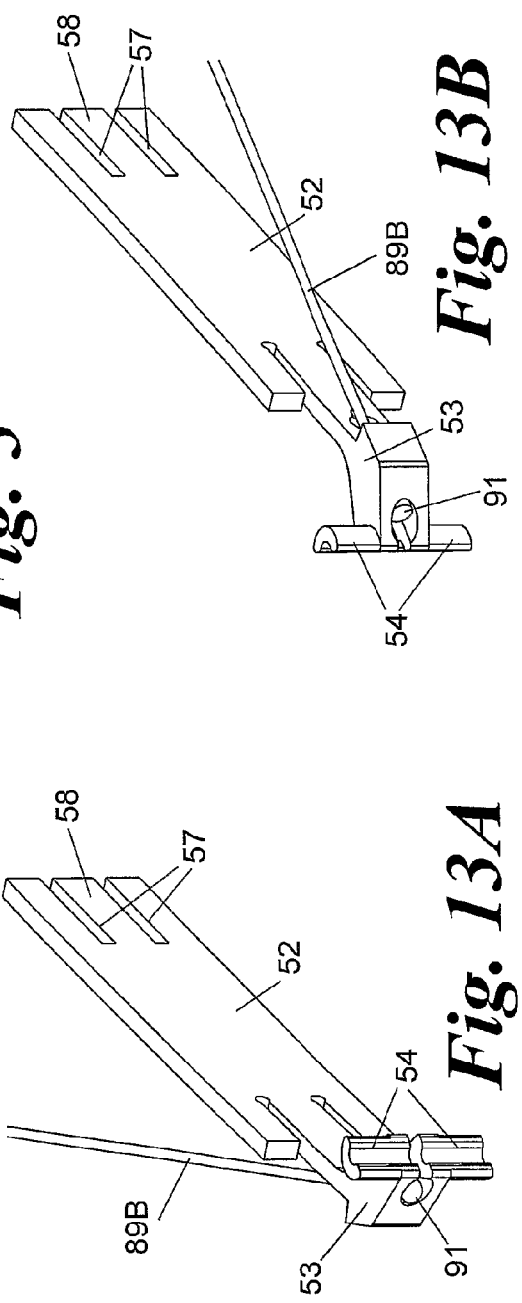
Fig. 5
Fig. 13A
Fig. 13B

TRANSPORTING LOADS

RELATED/PRIORITY APPLICATION

This application is a National Phase filing regarding International Application No. PCT/GB2007/002117, filed on Jun. 8, 2007. International Application No. PCT/GB2007/002117 relies upon Great Britain Application No. 0615707.7, filed on Aug. 8, 2006 and Great Britain Application No. 0621920.8, filed on Nov. 3, 2006.

This invention relates to transporting loads, more particularly to dollies for transporting loads and of the type comprising a generally rectangular load-receiving platform having four wheels adjacent its corners, two of the wheels usually being castors to enable such a dolly to be manoeuvred easily, either by a detachable handle or by an operator's hands on a load on the platform, or it may be lifted by the prongs of a fork-lift truck under the platform.

One object of the invention is to provide means—other than brakes engaging wheels—for preventing movement of such a dolly, when necessary, with or without a load thereon.

U.S. Pat. No. 4,073,369 discloses a service cart for serving food and drink in aircraft having a brake and tie-down mechanism, in which the brake mechanism has brake shoes movable down from inoperative positions below the body of the cart by brake levers connected by toggle links to a lever arm on a pedal, one at either end of the cart, to bring the brake shoes into engagement with the floor. Although not described anywhere in the text FIG. 3 of this document shows the cart raised bodily by the brake shoes upon depressing of either pedal to raise all the wheels of the cart off the floor. In view of this cart being for use in aircraft all weight is required to be minimised, both of the cart and of food and drink therein. In contrast, another object of the present invention is to provide a dolly capable of carrying and statically storing thereon substantially heavy loads, e.g. of the order of 500 kg.

EP-A-0 666 209 discloses a roll container having alongside one side of the container downwardly extendable supports each suspended by an elbow lever (or toggle links) from a cross-bar of the framework, with one elbow lever a mirror image of the other, a pair of upstanding hand levers pivoted on a lower cross-bar and linked one to each of the common pivots of the elbow levers, and a transverse link pivoted to the hand levers above and below respectively the pivots on the lower cross-bar, whereby pulling apart of the hand levers causes the supports to engage the ground (or floor) and, although not illustrated, upon reaching their fully extendable state, to tilt the roll container and raise its wheels at that side from the ground. Such a mechanism is not adaptable for incorporation entirely below the platform of a dolly as initially described. Thus, it is a further object of the present invention to overcome this limitation.

According to the present invention, a dolly comprises a generally rectangular load-receiving platform having four wheels adjacent its corners, bearers suspended below the platform and adapted to be moved relative to the platform down from and up to inoperative positions, at least one pedal at one side of the dolly, linkage between the pedal and the bearers whereby upon initial depressing of the pedal the bearers are lowered into engagement with the floor or ground, each of the bearers being suspended by pairs of toggle links arranged to move into substantially in-line positions during final depressing of the pedal to lift the platform and raise the wheels clear of the floor or ground, and the pedal has a lever arm affording a mechanical advantage that is amplified by the mechanical advantage of the toggle links themselves moving into in-line positions, locking means for securing the bearers in floor or ground-engaging positions, and release means activatable to cause raising of the bearers from the floor or ground when the dolly is required to be movable on its wheels.

The amplified mechanical advantage achievable is such that an acceptable pressure by an operator's foot on the pedal, e.g. of the order of 35 kg, will be adequate to lift the dolly and a substantial load thereon, e.g. of the order of 500 kg, e.g. by as little as 1.00 mm.

Preferably, the locking means comprises shoulders on the toggle links of each pair, the disposition of the shoulders being such that they come into abutment when the toggle links have moved slightly beyond in-line positions. Consequently, the greater the load on the platform the more forcibly are the shoulders urged together and the more securely are the bearers held in floor or ground-engaging positions. Longitudinal bars preferably, extend from the common pivots by which one of the bearers is suspended to the common pivots of the pairs of toggle links by which the other bearer or bearers is or are suspended, whereby the latter pairs of toggle links and bearer or bearers become "slave" to the movements of the former pairs of toggle links and bearer; and each toggle link may be bifurcated, one arm of each link fitting between the arms of the other link at the toggle joint with the common pivot, and with the respective longitudinal bar between the innermost pair of respective arms.

The at least one pedal may serve as the release means by being adapted to be lifted by the toe of an operator's boot or shoe, to unlock the bearers and allow spring means to move the bearers upwards out of floor or ground-engaging positions.

Alternatively, the at least one pedal may have a spring return to a raised neutral position and the linkage provided with a change-over system, whereby, after depressing the pedal to bring the bearers into engagement with the floor or ground, the bearers are locked in floor or ground-engaging positions while the pedal is returned to its raised neutral position, ready upon subsequent depressing of the pedal to cause reverse movement of the linkage, to unlock the pairs of toggle links and allow spring means to return the bearers to their inoperative positions.

The linkage may comprise a rod from the lever arm of the pedal to a crossbar connecting the common pivots of the pairs of toggle links by which one of the bearers is suspended.

Again, two pedals may be provided at least at one end of the platform, one pedal being operative on the linkage to effect movement of the bearers into engagement with the floor or ground and locking of the bearers, while the other pedal is operative to release the bearers and allow or cause reverse movement of the linkage; however a single pedal serving both purposes avoids the need to identify the pedals (as by colour coding) for respectively lowering and raising of the bearers.

It is preferable to provide at least one pedal at the opposite side (or "end") of the dolly, to ensure that the dolly cannot be parked (especially by a fork-lift truck) with a single pedal inaccessible for foot-actuation.

The crossbar may be omitted from the linkage, which is connected between the lever arm of the pedal and each of the longitudinal bars extending between the common pivots of the pairs of toggle links.

The pedal may be bifurcated to form two lever arms, each of which is connected by linkage to a respective one of the longitudinal bars extending between the common pivots of the pairs of toggle links.

The linkage preferably comprises wire rope runs, with one run from each side of the lever arm or from each lever arm of the pedal secured to the respective longitudinal bar, there also being another run from each side of the lever arm or from each lever arm of the pedal to release means for the pairs of toggle links coupled by the respective bar, and each release means comprises a spring-loaded reciprocable and deflectable pawl adapted to engage a shoulder on the respective longitudinal bar upon alternate depressings of the pedal to pull the respective longitudinal bar in the opposite direction to that for lowering the bearers, there being reversal of one of the runs round a pulley to effect the change-over of the direction of movement of the respective longitudinal bar, and the extent of depressing of the pedal for effecting pulling of each longitudinal bar by the respective pawl when engaged with its shoulder being appreciably less than (e.g. up to one-half of) that for effecting movement of the pairs of toggle links into in-line positions.

With the dolly preferably provided with a pedal at the opposite side (or "end"), there will be a total of eight wire rope runs, two from each side of the lever arm or from each of the lever arms of the other pedal being secured, one on each side to the respective bar and the other to the respective release means, again with pulleys, one on each side, for reversal of the direction of one wire on each side.

The eight wire rope runs may be provided by eight individual lengths of wire rope, but these require not only sixteen anchoring points but also eight very precise lengths or eight adjustment means for their individual lengths to ensure equal synchronised movements of the longitudinal bars.

The number of anchoring points, precise length of wire rope or adjustment means may be drastically reduced by providing the eight wire rope runs by either (A) two lengths of wire rope, with one length at each side secured to one pedal, running to and round a pulley on a horizontal axis on the lever arm of the other pedal, then to an anchorage on the respective bar, and continuing to the release means via a pulley disposed between the release means and the first-mentioned pedal, or (B) one length of wire rope having one end secured to the release means at one side, running round a pulley between the release means and the nearer pedal, then via an anchorage on the respective bar to a pulley on a horizontal axis on that side of the lever arm of the other pedal, back from there to a pulley on a vertical axis on the respective side of the lever arm of the first-mentioned pedal, crossing over from that pulley to a like pulley on the other side of the lever arm of that pedal, then in reverse order to a pulley on a horizontal axis on the lever arm of the other pedal, and continuing to the other release means via an anchorage on the other bar and a pulley between the release means and the pedal with the pulleys on vertical axes. However, the eight wire runs are preferably provided by four lengths of wire rope, with, at each side of the lever arm or each lever arm of each pedal, an anchorage for a wire rope length extending to and round a pulley on a horizontal transverse axis on the lever arm or respective lever arm of the other pedal and back to an anchorage on the longitudinal bar or to an anchorage on the pawl of the release means, respectively.

Each anchorage at each pedal preferably includes adjustment means, e.g., a screw or nut accessible to a tool from the respective end of the dolly, for adjustment of the effective length of the respective wire, both initially and, if necessary, during maintenance. Spring means, e.g. a compression spring is preferably incorporated in an anchorage of each wire rope length to the respective longitudinal bar, to take up slack in the respective wire rope run during return of the respective pedal to neutral position, while the spring-loading of each pawl takes up slack in the respective wire rope length during return of the respective pedal to neutral position.

The dolly platform is preferably moulded in plastics integrally with skirt portions round the sides and a formation of depending stiffening webs forming spaces to accommodate the linkage.

The or each pedal is preferably accommodated wholly beneath the platform in a space also defined by depending stiffening webs, and an opening is provided in the adjacent skirt portion to afford access by the toe of an operator's boot or shoe. Thus, the or each pedal is protected against accidental operation, nor does it interfere with compact accommodation within transport or storage enclosures.

The depth of some of the stiffening webs is preferably such that the lower edges of the webs will be engaged by the prongs of a fork-lift truck rather than the linkage. Alternatively, there may be provided a cover for at least parts of the spaces accommodating the linkage to provide greater areas for engagement by the prongs of a fork-lift truck than the lower edges of the webs alone, and the cover may have upstanding formations complementary to formations depending from the platform forming bearings for stub pivots of the or each pedal.

While two bearers extending parallel to and adjacent the smaller sides (or ends) of the platform may suffice, there are preferably three bearers, one between each respective pair of corners of the platform and one intermediate of the longer sides. Integral upward extensions at the ends of each bearer may be guided for vertical movement in spaces between the stiffening webs and skirt portions, and with vertical channels with open upper and lower ends provided in bearers adjacent the smaller sides (or ends) of the platform and their upward extensions to accommodate the wheels, which have mountings permanently secured to the underside of the platform. When the bearers are locked in floor or ground-engaging positions the dolly resembles a pallet, spaces between the bearers and between the upward extensions of the bearers afford access for the prongs of a fork-lift truck approaching from the sides or ends.

The bearers and their upward extensions may be incorporated in a single moulding, but are preferably separate mouldings detachably connected to longitudinal beams, to enable any one moulding to be replaced upon becoming damaged. The longitudinal beams may be in the form of upwardly facing channels, similar longitudinal beams formed by downwardly facing channels being secured along the underside of the platform with upper pivots of the pairs of toggle links disposed between the sides of the downwardly facing channels and lower pivots of the pairs of toggle links disposed between the sides of the upwardly facing channels, and with tension springs connected between the beams to effect return of the bearers to their inoperative positions. The ends of the lower pivots of the pairs of toggle links may project from the sides of the lower, upwardly facing channels and be guided for vertical movement in brackets depending from the platform. Alternatively, guide pins may depend from the upper beams and be a sliding fit in holes in the lower beams.

Further, the upper surface of the platform may be provided with a matrix of formations (recesses or ribs) for location of boxes or trays, or for stacking like dollies with their bearers in floor or ground-engaging positions, and sockets may be provided e.g. at or adjacent the corners of the platform, to receive lower ends of upright frame members of side walls and/or rear or front walls, e.g. of mesh construction, to convert the dolly to a rollcontainer.

Embodiments of the invention and preferred and alternative forms of linkage will now be described, by way of example only, with reference to the accompanying drawings, in which:—

FIG. 3 is a diagrammatic longitudinal vertical section through the dolly as seen in FIG. 1 showing three bearers suspended below the platform by pairs of toggle links;

Figure 6:
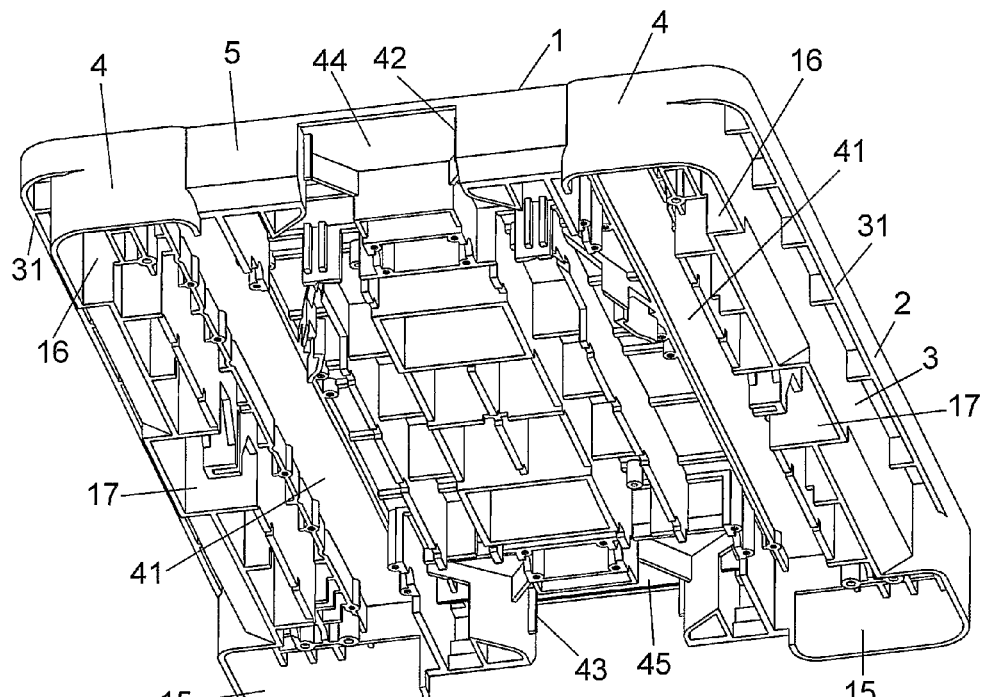
Figure 7:
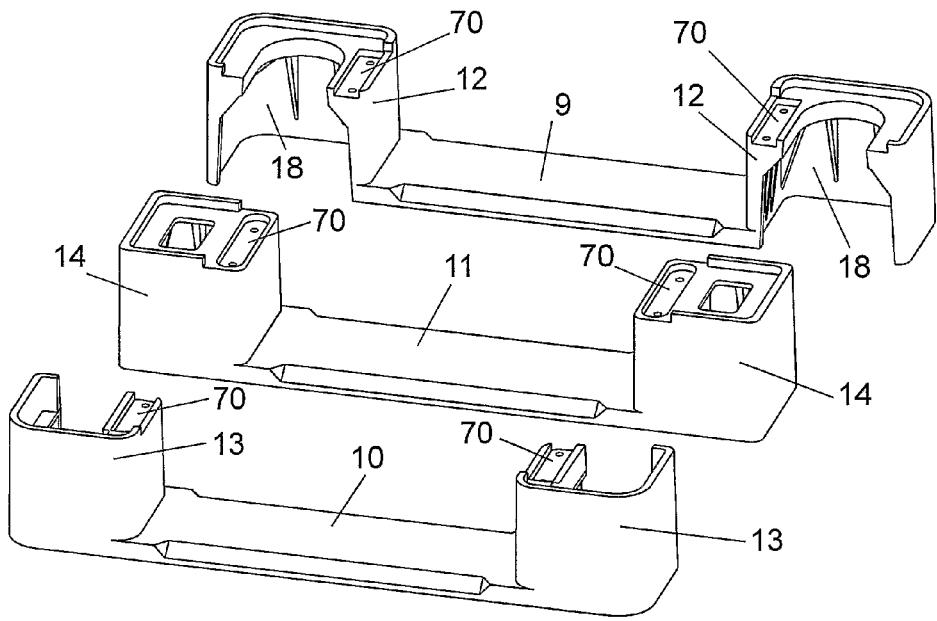
Figure 8:
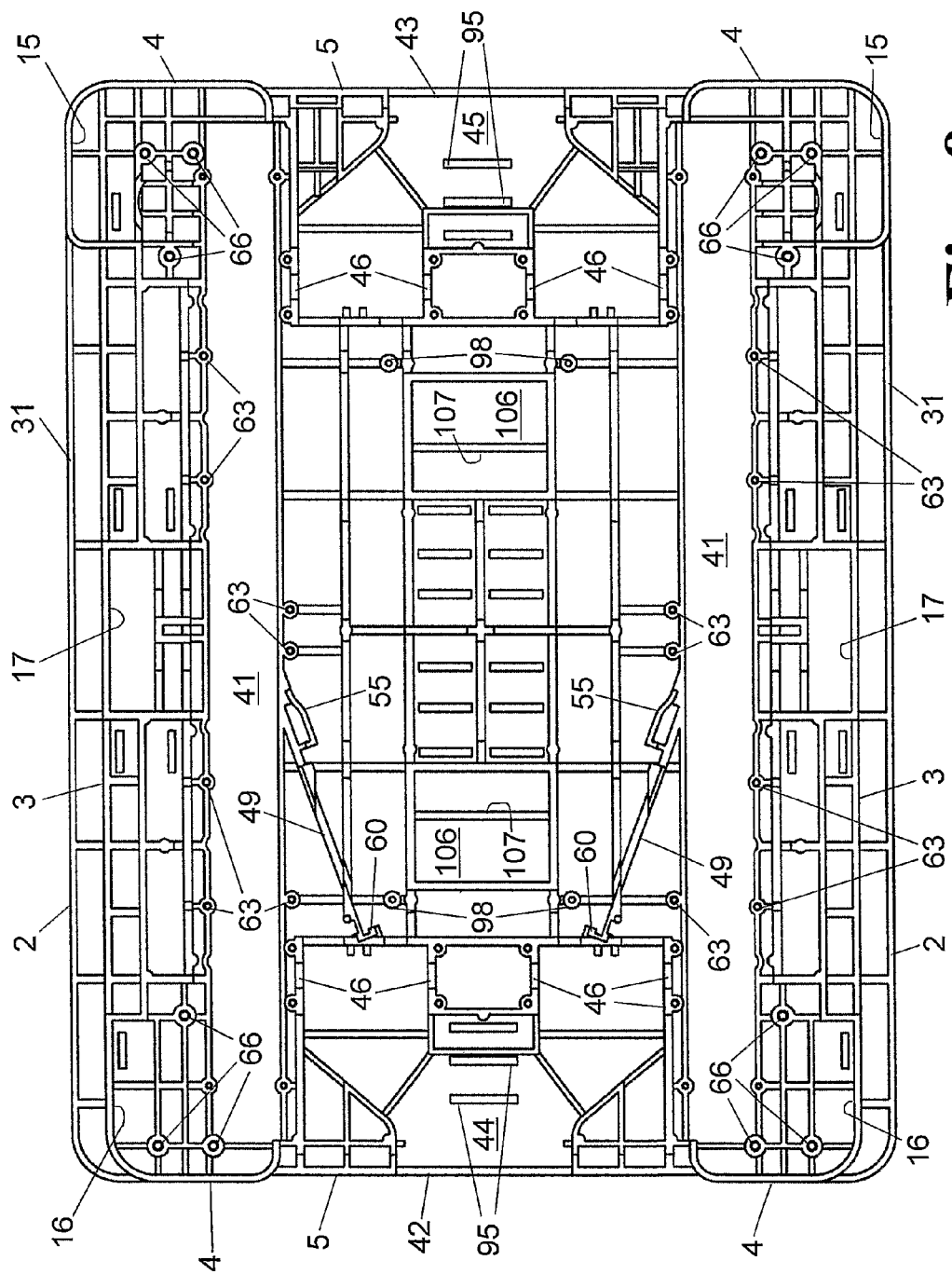
Figure 9:
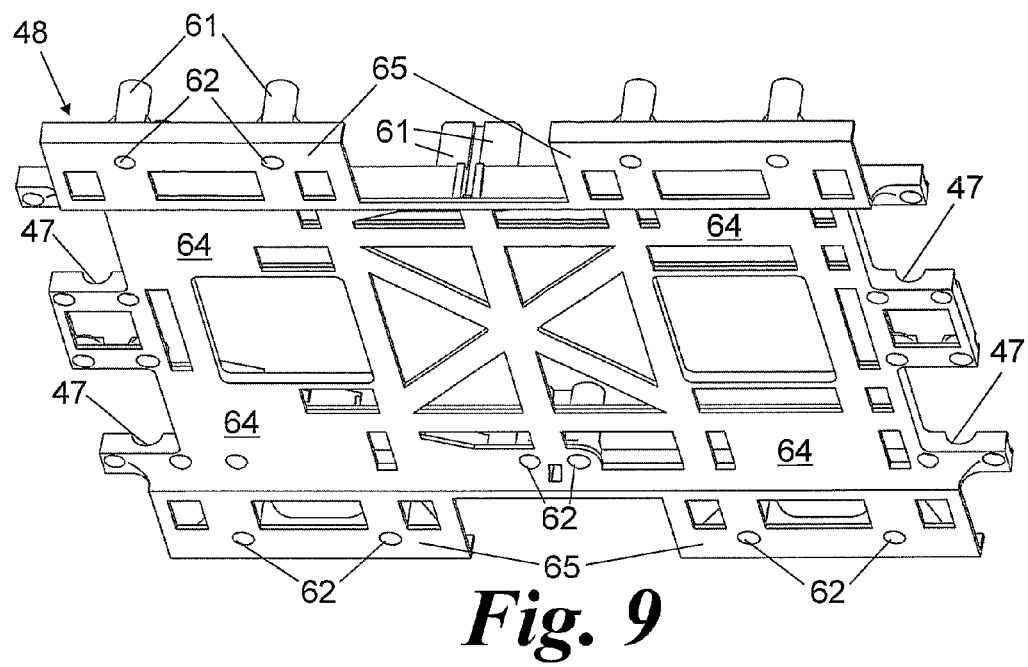
Figure 10:
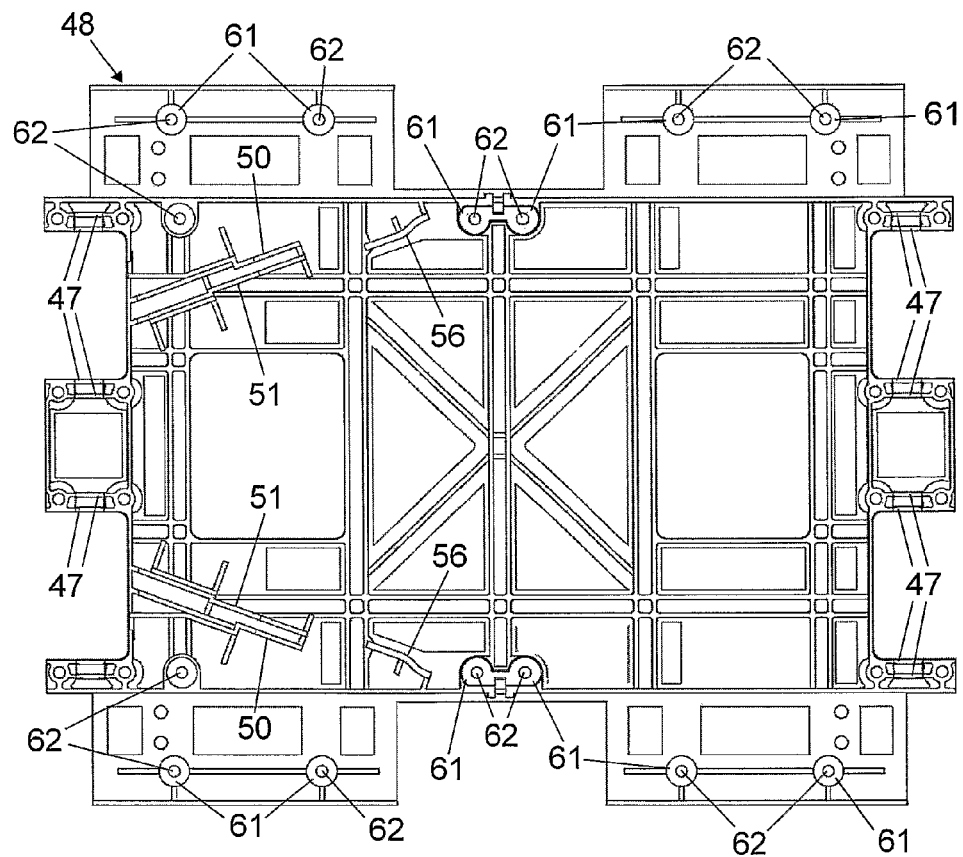
Figure 11:
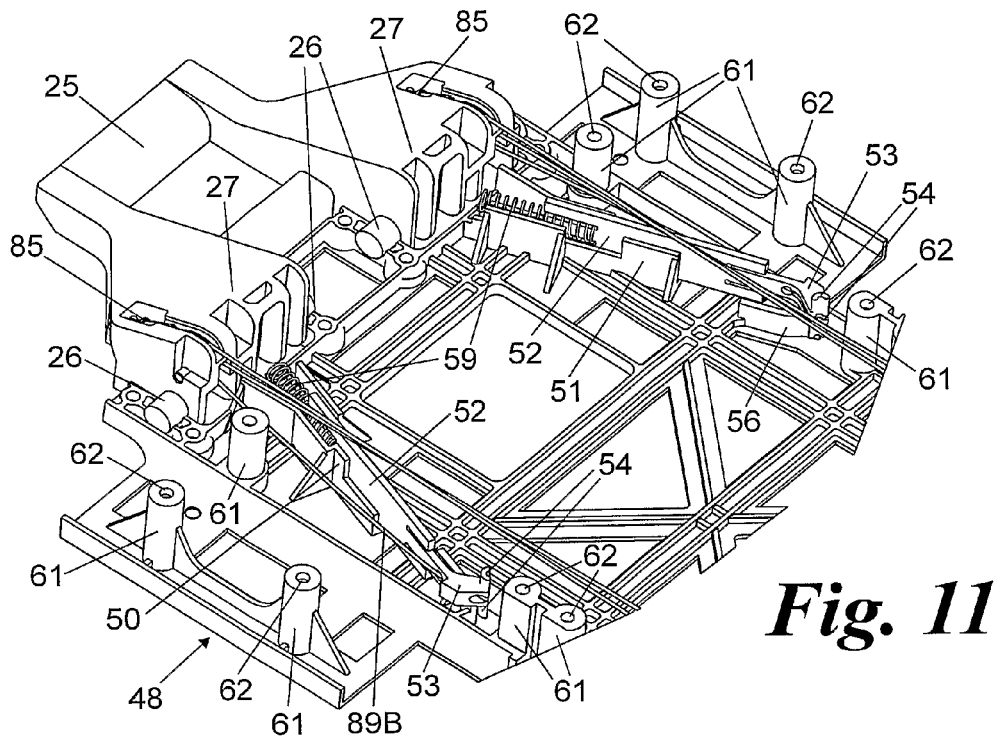

FIG. 4 corresponds to FIG. 3 but shows the dispositions of the pairs of toggle links, and one of a pair of pedals linked thereto (by either of the forms of linkage to be described presently) when the bearers make contact with the floor or ground;

FIG. 5 corresponds to FIG. 3 or FIG. 4 but shows the dispositions of the pairs of toggle links and the actuated pedal when the platform of the dolly (and a load carried thereon but not shown) has been lifted bodily to raise the wheels clear of the floor or ground;

FIG. 6 is an isometric underneath view of the platform moulding of the preferred embodiment of the invention;

FIG. 7 is an isometric view from above of three bearer mouldings for incorporation in the preferred embodiment;

FIG. 8 is an underneath elevation of the platform moulding;

FIG. 9 is an underneath isometric view of a cover moulding for attachment to the underside of the platform moulding;

FIG. 10 is a plan view of the cover moulding;

FIG. 11 is a fragmentary isometric view of part of the cover moulding seen from above with associated components assembled, including one pedal in neutral position.

Figure 12:
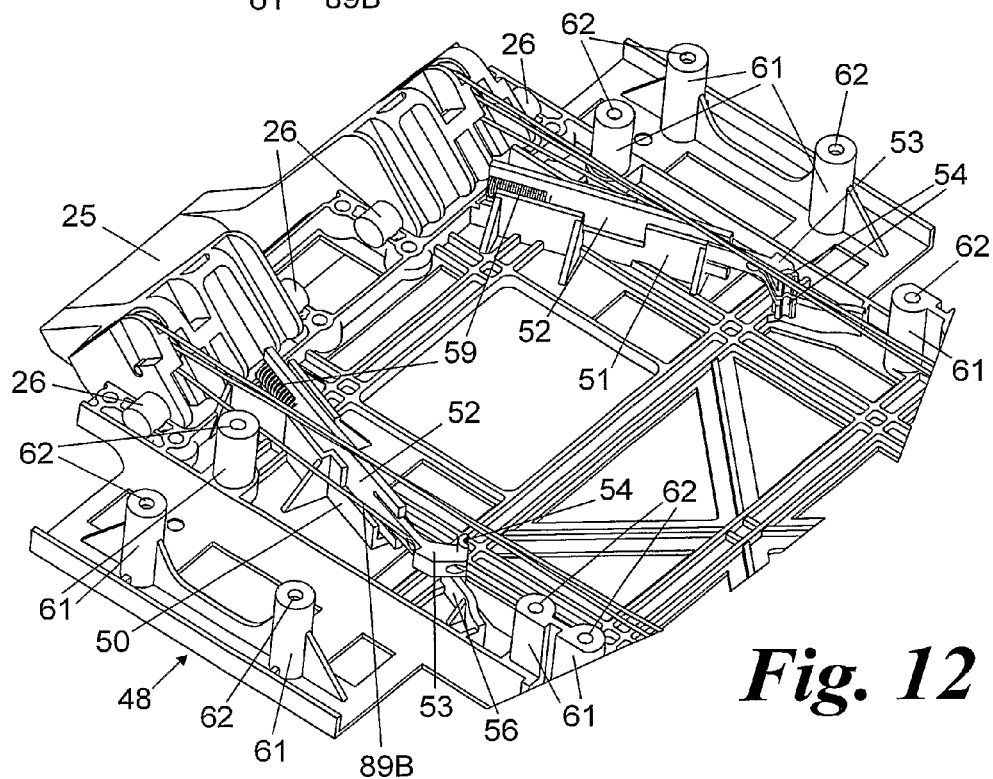
Figure 14:
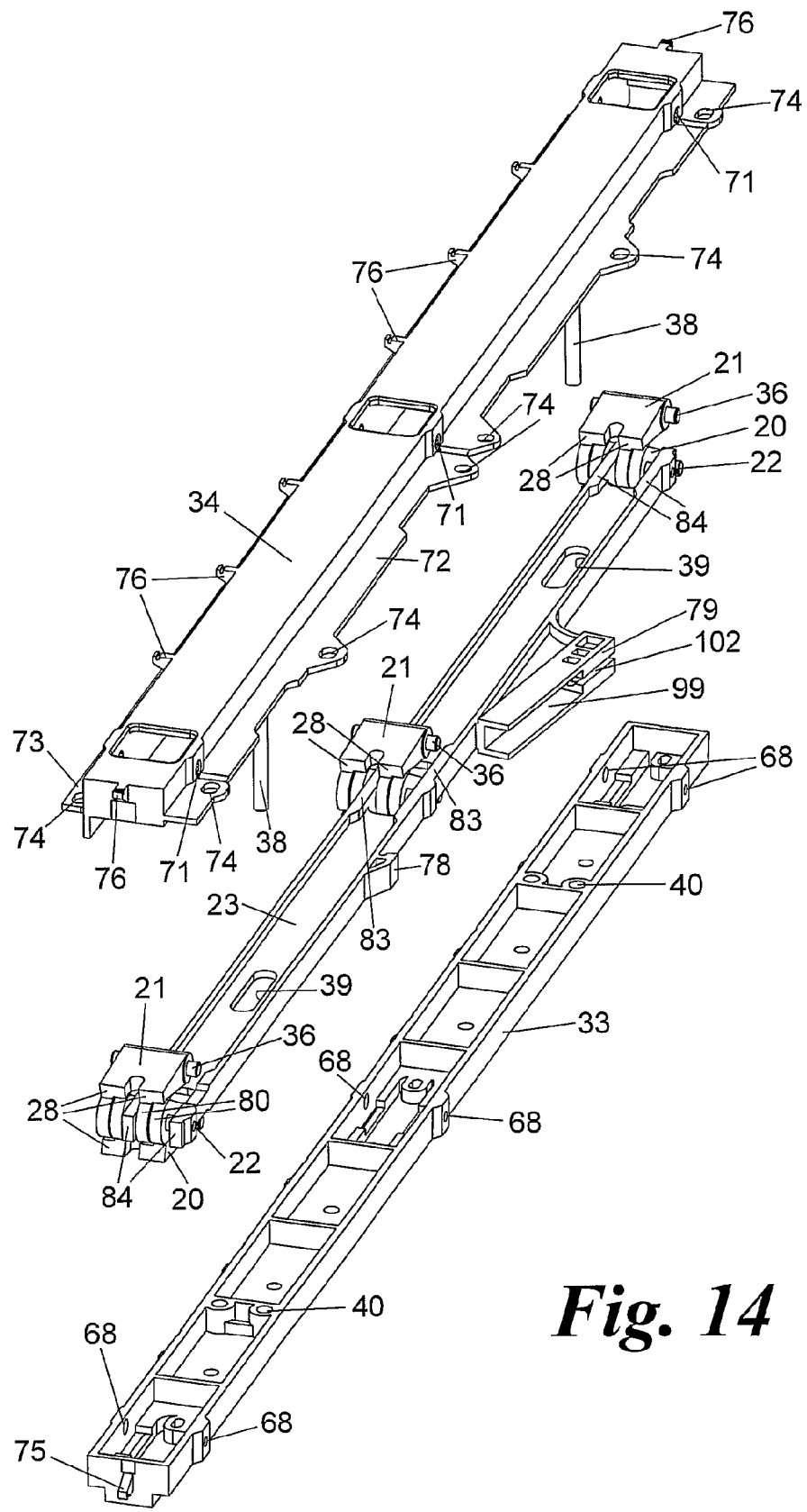
Figure 15:
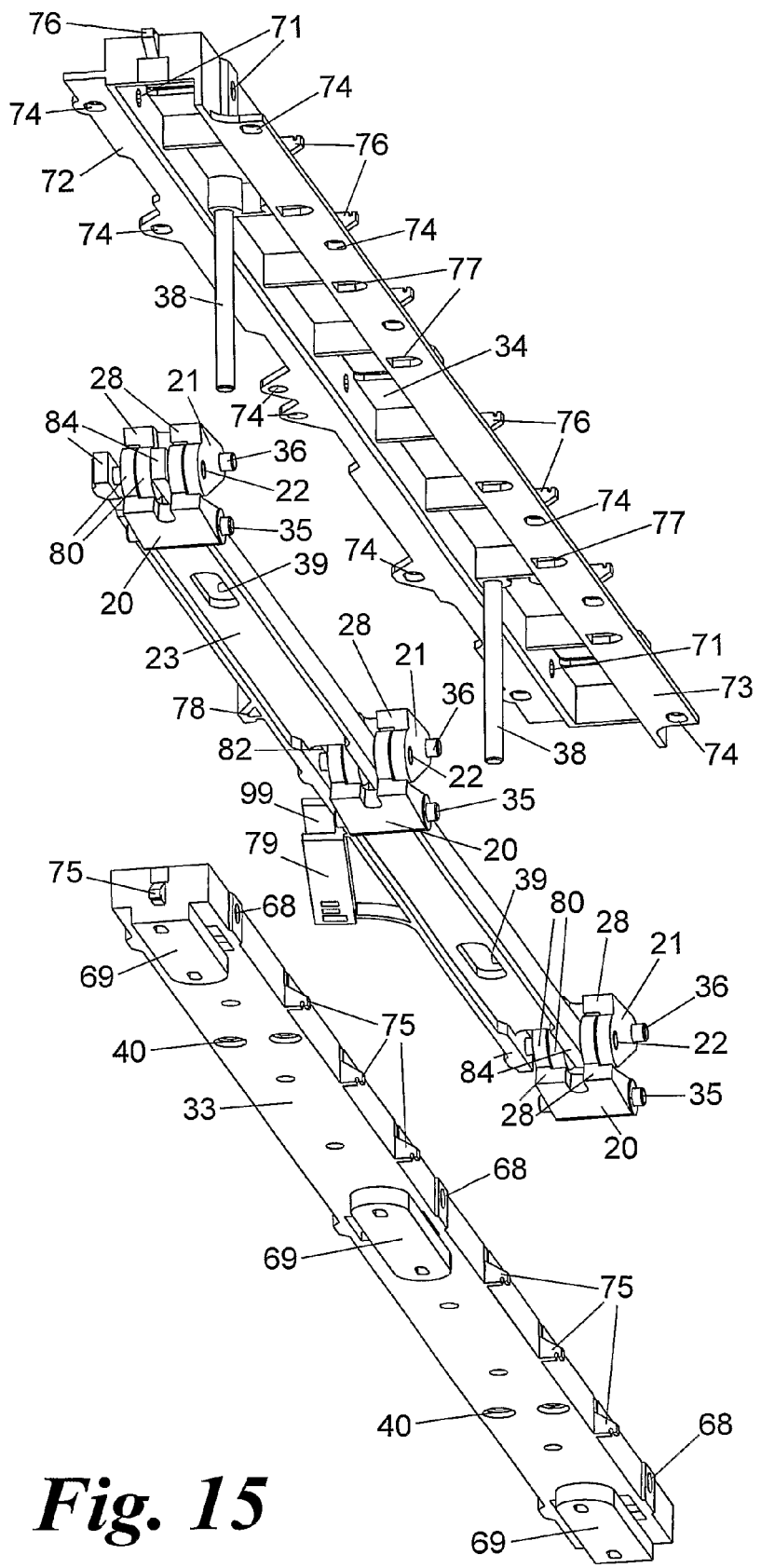
Figure 16:
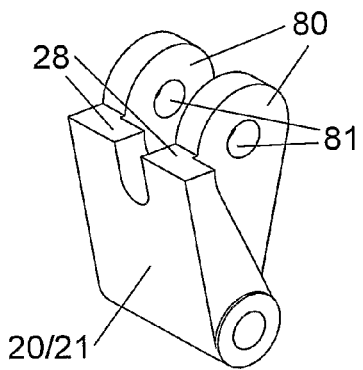
Figure 17:
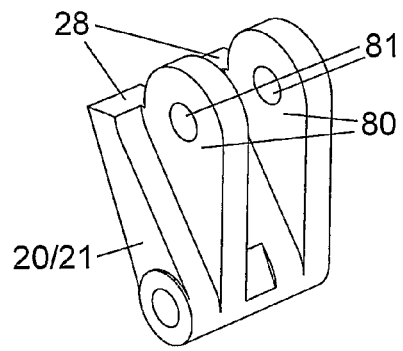
Figure 18:
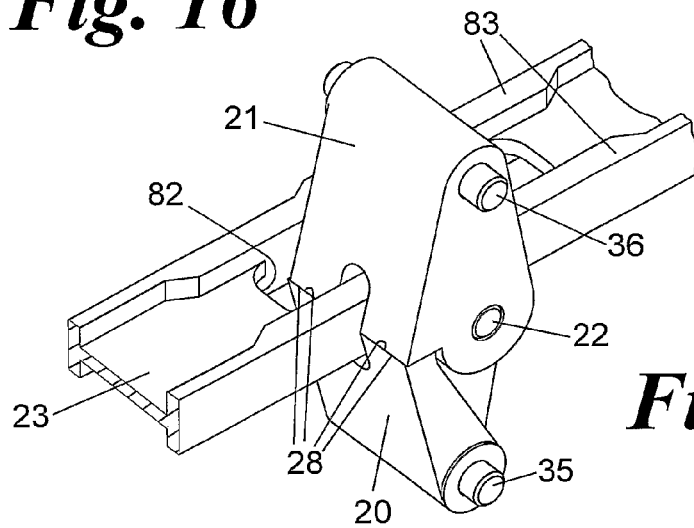
Figure 19:
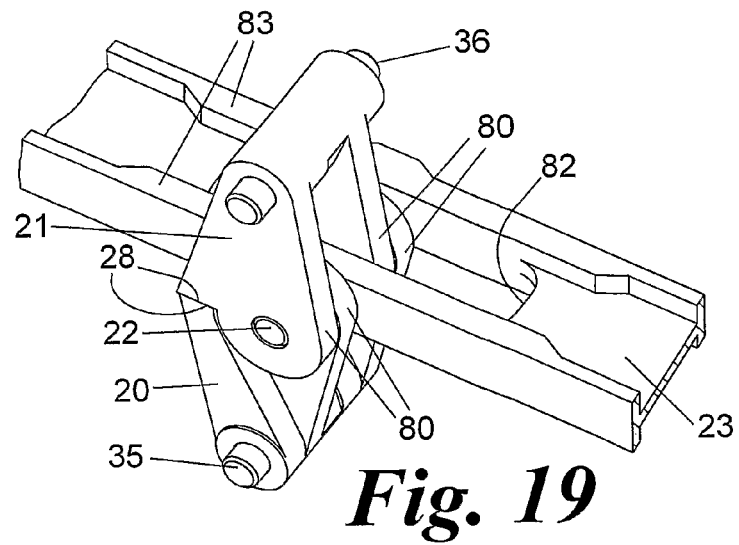

FIG. 12 corresponds to FIG. 11 but shows the pedal in fully depressed position;

FIG. 13A is an isometric view of one of the pawls seen in FIGS. 11 and 12;

FIG. 13B is an isometric view of the pawl from the opposite side;

FIG. 14 is an exploded isometric view from above showing the components of one of the assemblies incorporating pairs of toggle links in the preferred embodiment;

FIG. 15 is an exploded isometric view from below showing the components of the other assembly incorporating pairs of toggle links in the preferred embodiment;

FIG. 16 is an isometric view of a toggle link component for incorporation in the preferred embodiment;

FIG. 17 is an isometric view from the right-hand side of FIG. 16;

FIG. 18 is a fragmentary isometric view of two such link components assembled to form a middle pair of toggle links;

FIG. 19 is a fragmentary isometric view from the right-hand side of FIG. 18.

Figure 1:
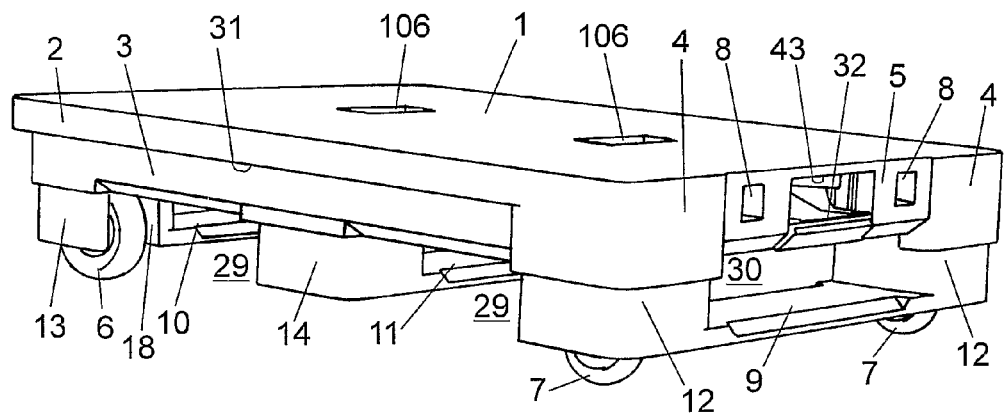
FIG. 1 is a perspective view from one end of a dolly in accordance with the present invention seen in its mobile condition.
Figure 2:
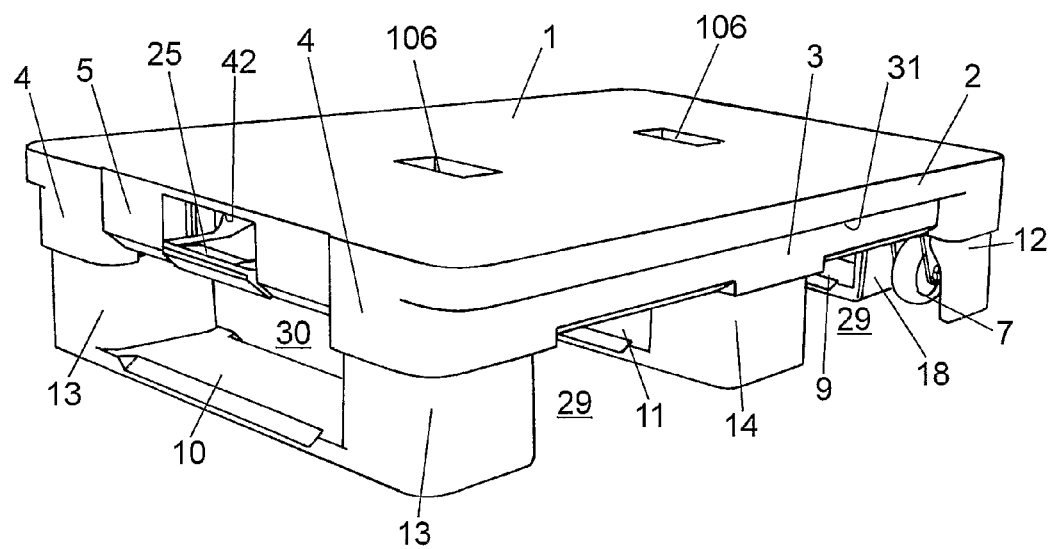
FIG. 2 is a perspective view from the other end of the dolly of FIG. 1 seen in its grounded or pallet-like condition.
Figure 20:
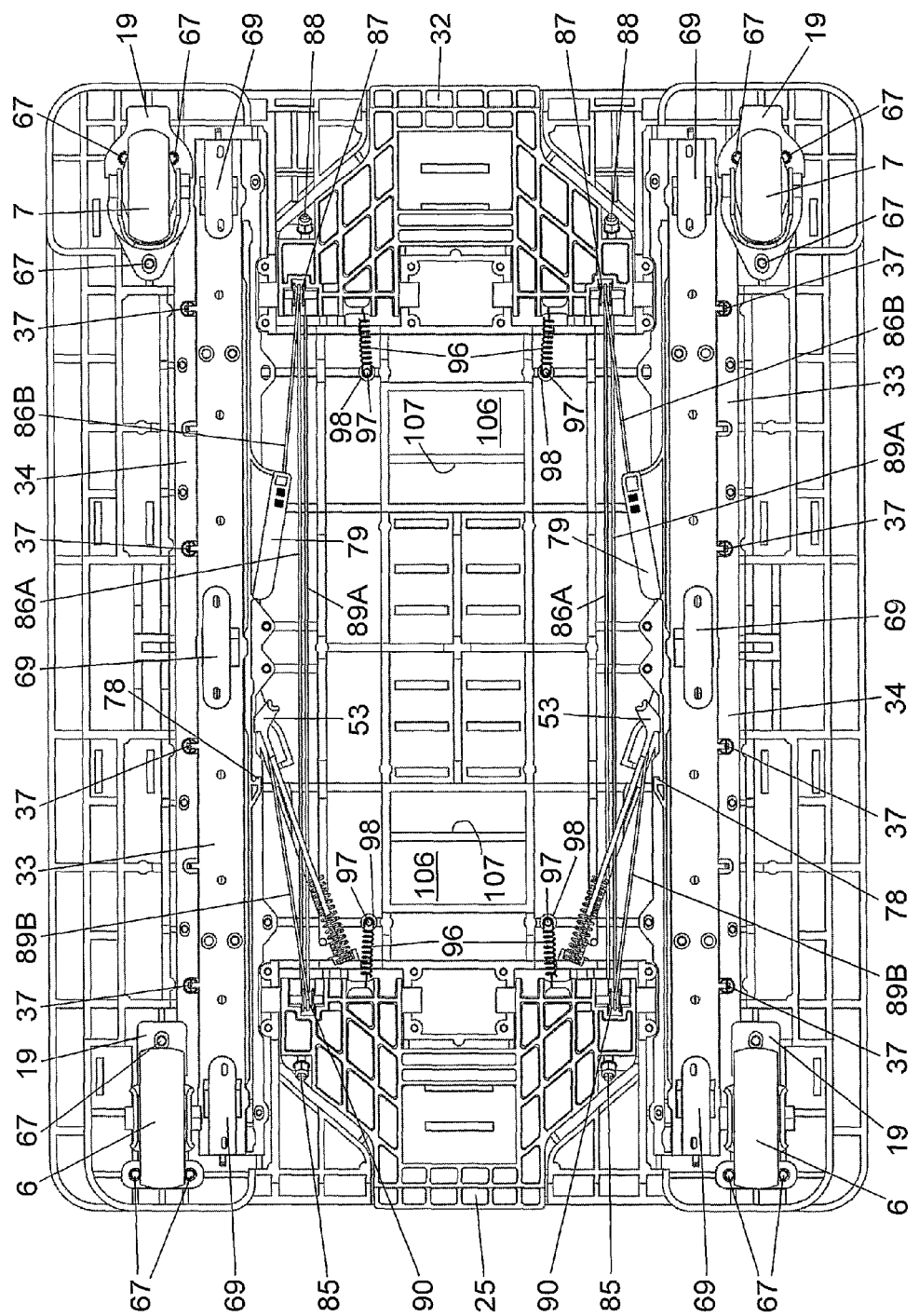
Figure 21:
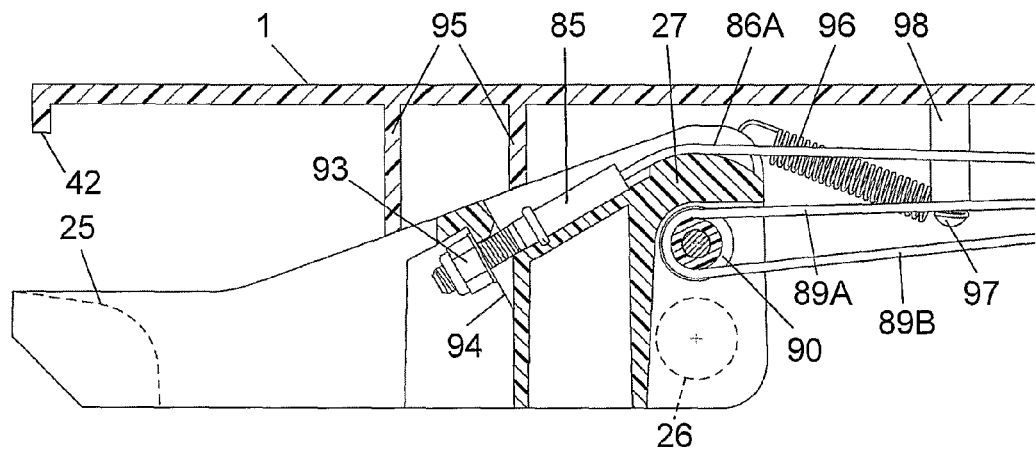
Figure 22:
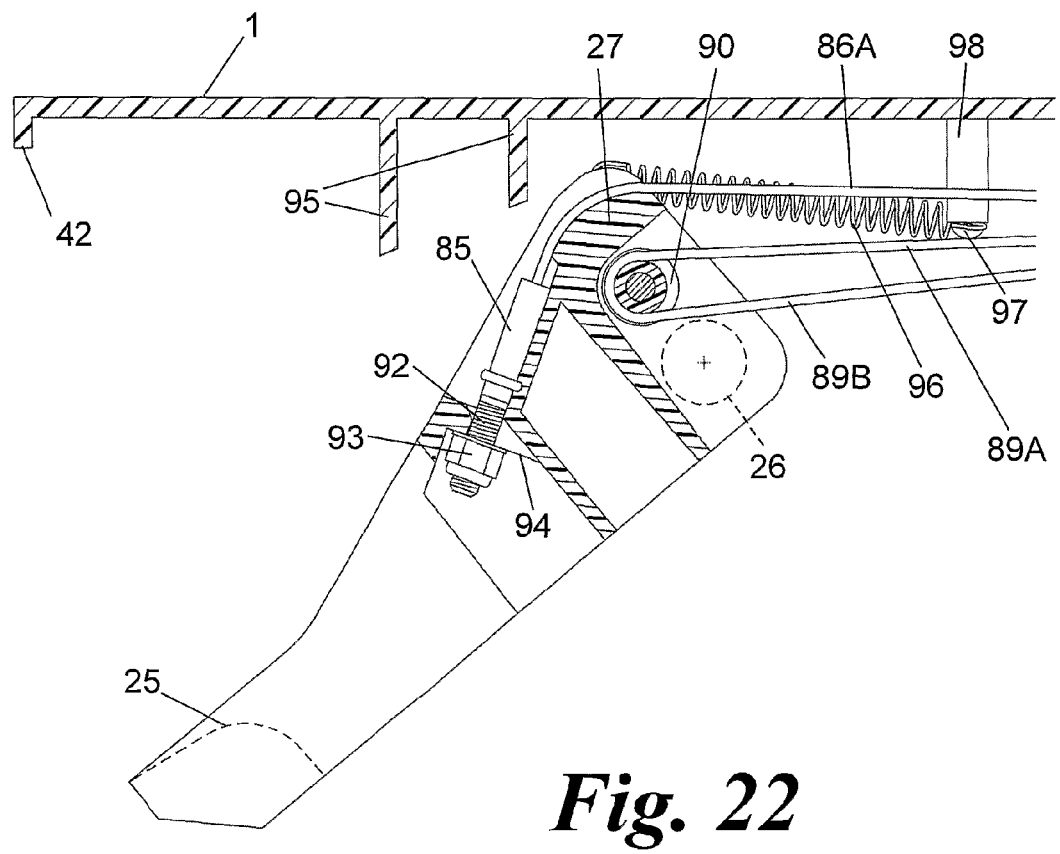
Figure 23:
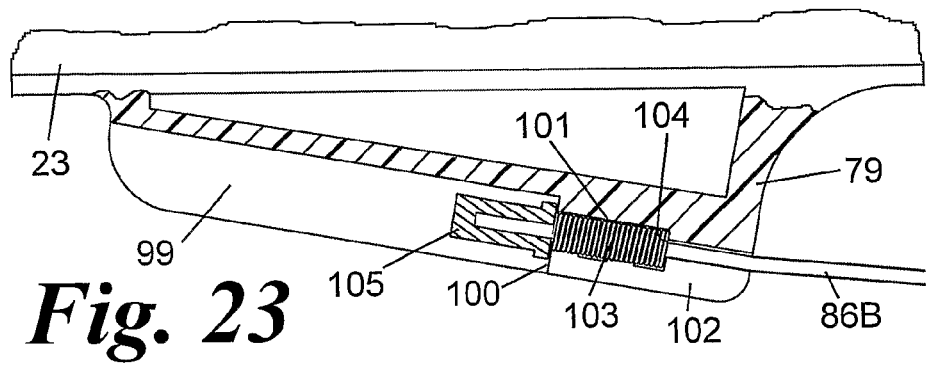
Figure 24:
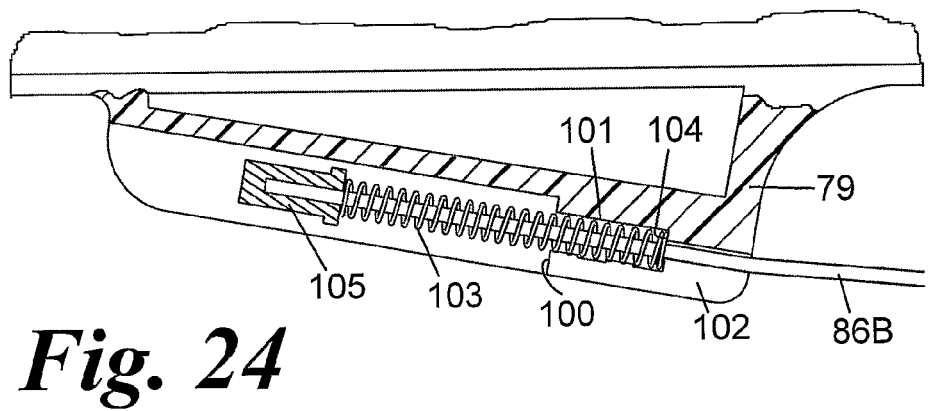
Figure 25:
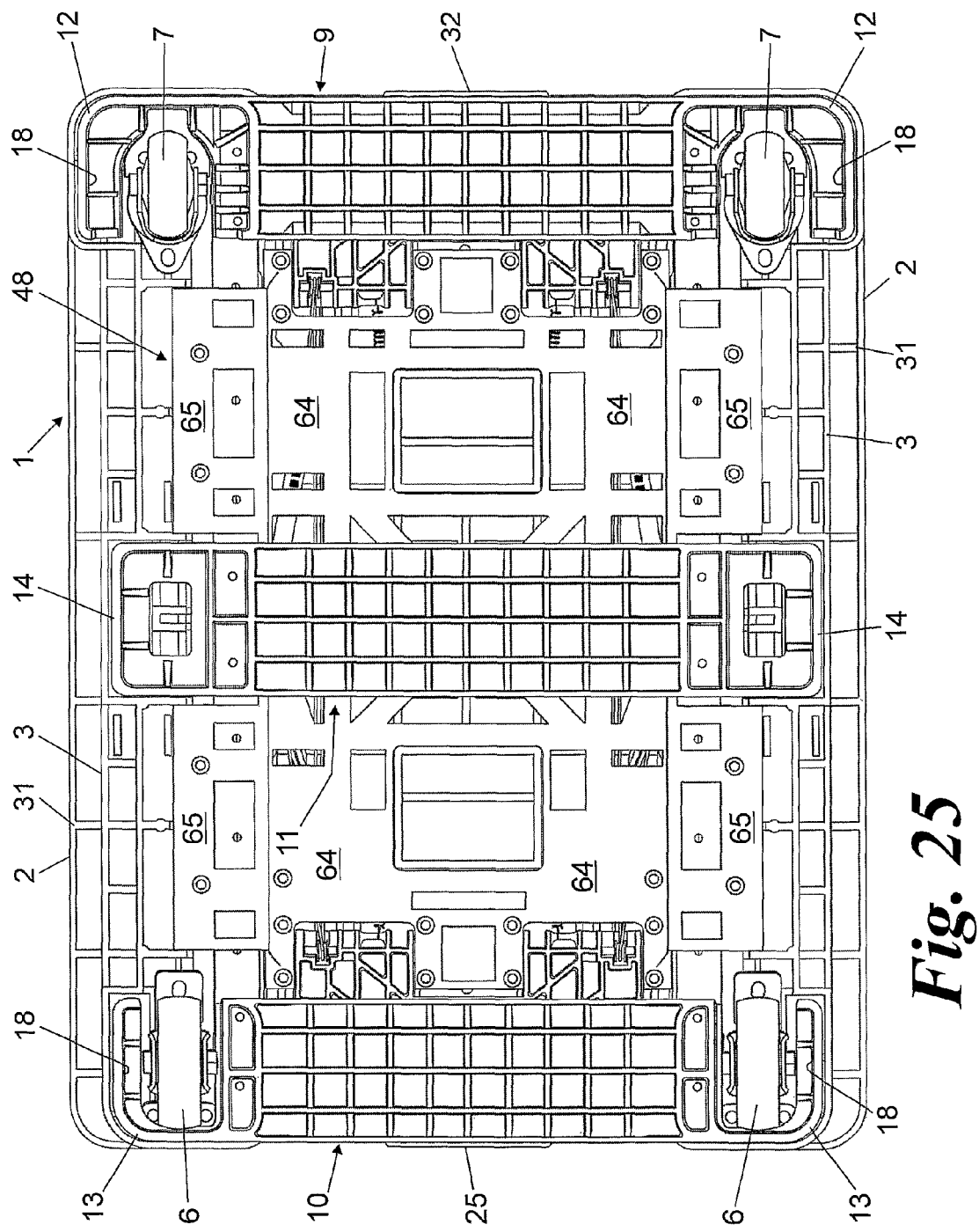
Figure 31:
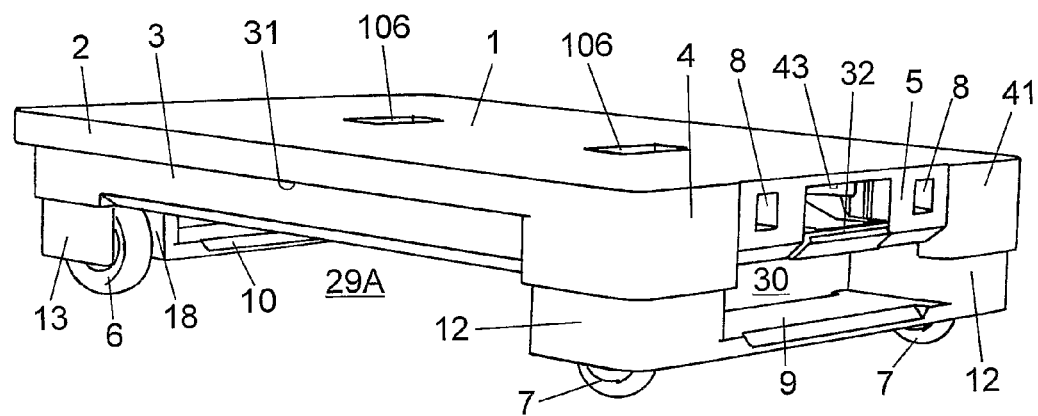
Figure 32:
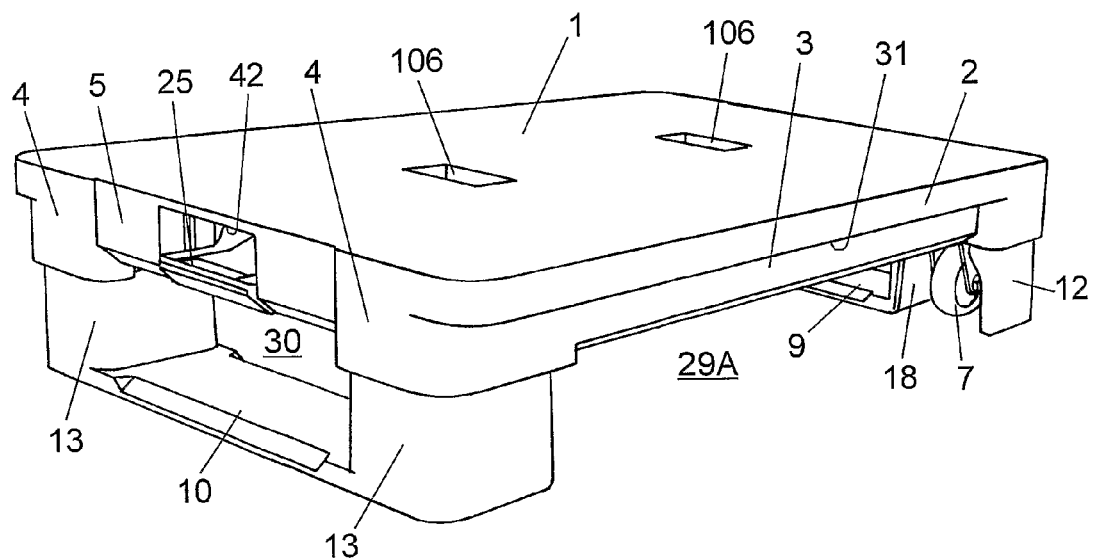
Figure 33:
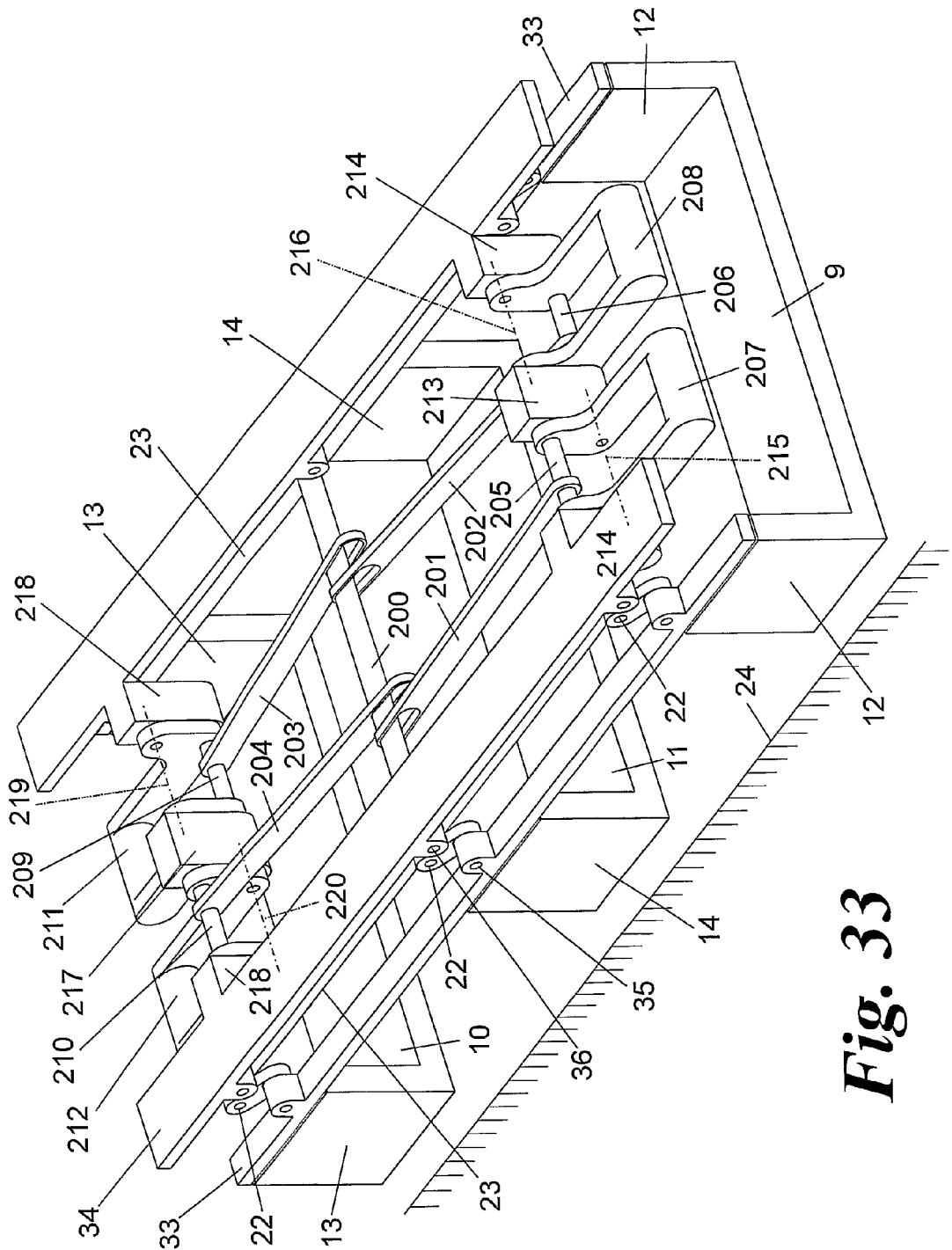
Figure 34:
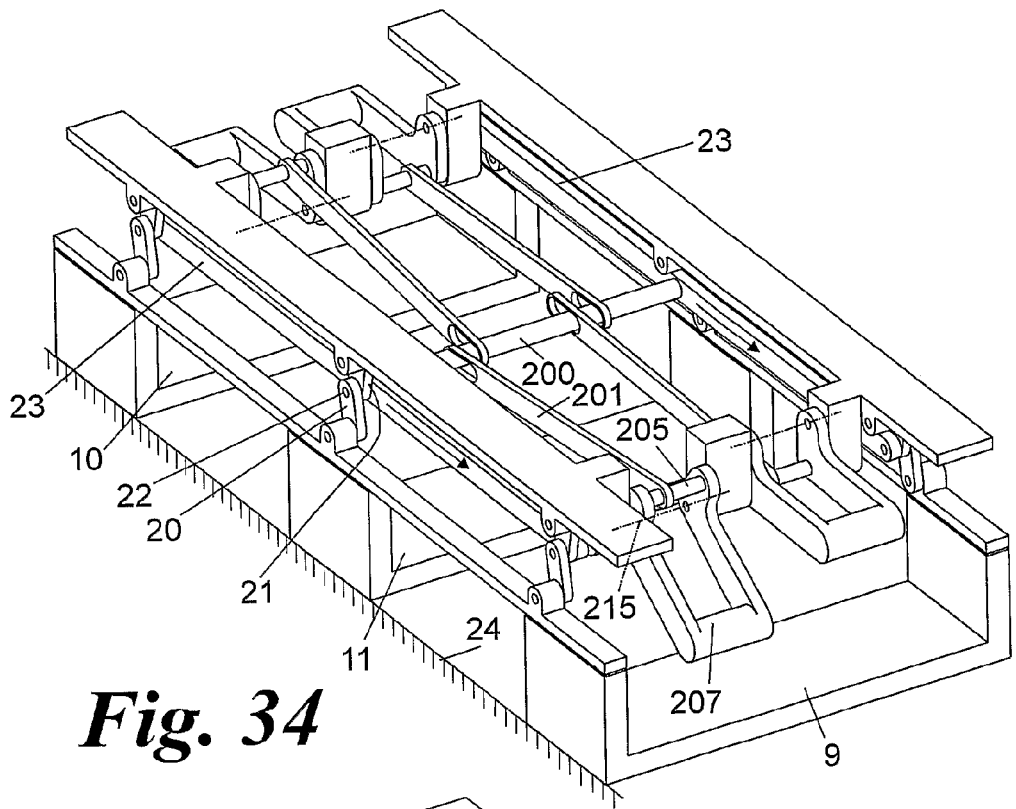
Figure 35:
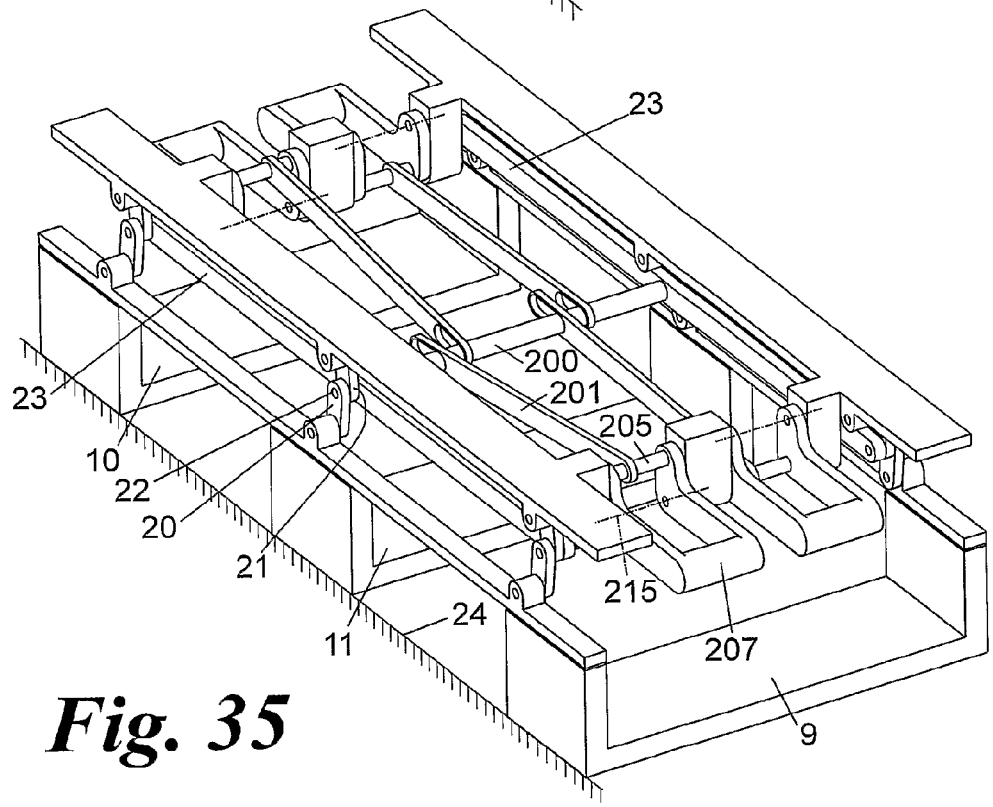

FIG. 20 is an underneath elevation of the preferred embodiment with its bearer mouldings and cover moulding omitted to enable the preferred form of linkage to be seen;

FIG. 21 is a fragmentary view partly in section through one lever arm of one pedal showing details of adjustment means for an anchorage for a wire rope length in the preferred form of linkage and a pulley for reversing such a wire rope length, with the pedal in neutral position;

FIG. 22 corresponds to FIG. 21 but shows the pedal in fully depressed position;

FIG. 23 is a fragmentary plan view, partly in section, of an anchorage for the other end of a wire rope length incorporated in the preferred form of linkage;

FIG. 24 corresponds to FIG. 23 but shows the spring taking up slack in the wire rope;

FIG. 25 is an underneath view of the complete preferred embodiment;

FIGS. 26 to 30 are a series of diagrammatic plan views illustrating the sequence of movements of the preferred form of linkage when operated by the left-hand pedal;

FIGS. 31 and 32 correspond to FIGS. 1 and 2 but show a dolly in accordance with the invention having two bearers instead of three;

FIG. 33 is a diagrammatic isometric view of an alternative form of linkage operated by a pair of pedals at either end of the dolly; and FIGS. 34 to 41 correspond to FIG. 33, but to a smaller scale, and show the sequence of movements, firstly when operated by the left hand pair of pedals and secondly when operated by the right hand pair of pedals.

FIG. 1 shows a dolly for transporting loads having a generally rectangular platform 1, typically of "Half-Euro" dimensions, 800 mm long and 600 mm wide, moulded in plastics, e.g., polypropylene, with integral skirt portions 2, 3 along the two longer sides and 4, 5 at each of the shorter sides or ends, and wheels 6, 7 adjacent its corners, two wheels 7 being castors to enable the dolly to be manoeuvred easily, either by a detachable handle (not shown, but engageable in apertures 8 in the skirt portion 5 at one end) or by an operator's hands on a load (not shown) on the platform.

Three bearers 9, 10, 11 (see also FIGS. 3 to 5, 7 and 25) again moulded in plastics e.g. polypropylene, extend parallel to the ends of the platform, with the bearers 9, 10 between respective pairs of corners of the platform and with the bearer 11 intermediately of the sides of the platform, and integral pairs of upward extensions 12, 13, 14 at the ends of the respective bearers are guided for vertical movement in spaces 15, 16, 17 between the skirt portions 2, 3 and 4 and some of a large number of stiffening webs depending from the platform (see FIGS. 6 and 8). Vertical channels 18 with open upper and lower ends are provided in the bearers 8 and 9 and their respective upward extensions 11, 12 to accommodate the wheels 6, 7, which have mountings 19 (see FIG. 20) permanently secured to the underside of the platform.

The bearers 9, 10, 11 are suspended below the platform by pairs of toggle links 20, 21 (see initially FIGS. 3 to 5 showing the pairs at one side only of the dolly) and thereby adapted to be moved down from and up to inoperative positions (FIG. 3), common pivots 22 of the pairs of toggle links being connected by longitudinal bars 23, whereby any one of the bearers and the pairs of toggle links by which it is suspended are "slave" to the other bearers and the pairs of toggle links by which they are suspended, thus enabling all the bearers to be moved simultaneously into contact with the floor or ground 24 (see FIGS. 2 and 4) upon initial longitudinal movement of the bars 23 in the direction of the arrow in FIG. 4, by depressing at least one pedal 25 (shown in broken line in FIGS. 3 to 5) on a pivotal axis 26 below one end of the platform 1 and having a lever arm 27 connected by linkage (not shown but of either of the forms to be described presently) to the bars 23.

Further depressing of the pedal 25 to the position shown in FIG. 5 causes the dolly to be raised bodily as the pairs of toggle links 20, 21 move simultaneously into substantially in-line positions, to raise the wheels 6, 7 from the floor or ground 24, the lever arm 27 of the pedal 25 affording a mechanical advantage that is amplified by the mechanical advantage of the toggle links as they move into in-line positions, i.e. from the position shown in FIG. 4 towards the position shown in FIG. 5, the bearers 9, 10, 11 being secured in floor or ground-engaging positions by the pairs of toggle links 20, 21 becoming locked by moving to slightly over-centre positions to a stop formed by shoulders 28 on the links in each pair coming into abutment with each other.

Thus the dolly is rendered immobile and is transformed into a pallet-like state. Spaces 29 between the bearers 9, 11 and 10, 11 respectively and spaces 30 between the pairs of upward extensions 12, 12; 13, 13 and 14, 14 respectively afford access for the prongs of a fork-lift truck (not shown) for manoeuvring the dolly, particularly when in its pallet-like state. It can be seen in FIGS. 1 and 2 that the lower side skirt portions 3 of the dolly are spaced inwards from the upper skirt portions 2, thus creating overhangs 31 to enable the dolly (not shown) to be pushed into shelving, e.g. in a warehouse or supermarket.

To ensure that the dolly cannot be parked (especially by a fork-lift truck) with a single pedal inaccessible for foot actuation, at least one pedal 32 is provided at the opposite end of the dolly, and the linkage in the preferred embodiment can be operated by means of either pedal 25 or 32, and includes a change-over system whereby release means is also operable by either pedal to allow raising of the bearers from the floor or ground 24 when the dolly is required to be movable again on its wheels.

Although the bearers 9, 10, 11 and their upward extensions 12, 13, 14 could be incorporated in a single moulding, they are advantageously formed as separate mouldings any one of which can be replaced upon becoming damaged, the upper ends of the respective upward extensions being detachably connected by longitudinal beams 33, one of which is shown in FIGS. 3 to 5, these figures also showing that each assembly incorporating pairs of toggle links 20, 21 includes another longitudinal beam 34 secured to the underside of the platform 1 with pivots 35 connecting the lower toggle links 20 to the beam 33 and pivots 36 connecting the upper toggle links 21 to the beam 34. Tension springs 37 between each pair of beams 33, 34 effect return of the bearers 9, 10, 11 back to their inoperative positions and guide pins 38 depend rigidly from each upper beam 34, pass through slots 39 in the respective bar 23 to allow for its longitudinal movement, and are a sliding fit in holes 40 in the respective lower beam 33, so that the upwards extensions 12, 13, 14 of the bearers 9, 10, 11 can be an easy fit in the spaces 15, 16, 17 in the platform moulding.

FIGS. 6 and 8 also show, within the lattice of longitudinal, transverse and angled stiffening webs, longitudinal spaces 41 for accommodating the assemblies incorporating the pairs of toggle links 20, 21, bars 23 and beams 33, 34 etc., and extending between the spaces 15, 16 for the upward extensions 12, 13 of the bearers 9, 10 and also communicating intermediately with the spaces 17 for the upward extensions 14 of the bearer 11.

The same two figures also show openings 42, 43 in the skirt portions 5 leading to spaces 44, 45 respectively for accommodating the pedals 25, 32 respectively. Half bearings 46 are provided in webs adjacent the spaces 44, 45 for stub axles 26 of the pedals 25, 32 (see also FIGS. 21 and 22), and the bearings are completed by half bearings 47 provided in webs upstanding from a cover 48 (see FIGS. 9, 10), e.g. of polypropylene.

Angled webs 49 in the platform moulding 1 and 50, 51 on the cover moulding 48 combine to form guides for spring-loaded plate-like slides 52 of reciprocable pawls 53 (see also FIGS. 13A, 13B) the head of each of which has horns 54 to follow further guide webs 55, 56 in the moulding 1 and on the moulding 48 respectively to effect deflecting of the pawl for a purpose to be described presently, and each slide has a pair of slots 57 to form a tongue 58 for location in one end of a coil compression spring 59 the other end of which locates against an abutment 60 in the moulding 1.

Upstands 61 on the cover moulding 48 have countersunk through holes 62 for screws (not shown) screwing into blind bores 63 in cylindrical enlargements at intersections of depending webs of the platform moulding 1 to secure the cover to the platform moulding after the components of the mechanism have been assembled and inserted.

Undersurface areas 65 of the cover moulding 48 rest on the prongs of a fork-lift truck when the prongs enter the spaces 29 between the bearers 9 and 11 and 10 and 11 respectively from either side of the dolly, or undersurface areas 64 of the cover moulding rest on the prongs when they enter the spaces 30 between the upward extensions 12, 12 or 13, 13 respectively from either end of the dolly.

The platform moulding 1 also includes blind holes 66 within the spaces 15, 16 to receive screws 67 securing the wheel mountings 19 (see FIG. 20).

FIGS. 14 and 15 show that each of the lower beams 33 is a moulding in the form of an upwardly facing channel with integrally moulded cross-bracings, holes 68 being provided in the sides of the channel for location of the pivots 35 of the lower toggle link 20, and tenons 69 project from the underside of each beam 33 for engagement in grooves 70 (see FIG. 7) in the tops of the upward extensions 12, 13, 14 of the bearers 9, 10, 11, to be secured by screws (not shown) through pairs of holes shown in these matching formations. The same two figures also show that each of the upper beams 34 is a moulding in the form of a downwardly facing channel with integrally moulded cross-bracings, holes 71 being provided in the sides of the channel for location of the pivots 36 of the upper toggle links 21, and flanges 72, 73 along the sides of each beam 34 are provided with holes 74 for screws (not shown) for securing the beams 34 in the spaces 41 in the platform moulding (see FIG. 8) by screwing into a number of the holes 63 in the cylindrical enlargements of junctions between the depending webs.

Each of the lower beams 33 is provided with six hooks 75 along one side and one at each end for the lower ends of tension springs 37, and one corresponding side and the ends of each of the upper beams 34 are similarly provided with hooks 76 for the upper ends of the springs, but, as indicated by FIGS. 3 to 5 and 20, four springs at each side have been found to be adequate. The flange 73 of each upper beam 34 has slots 77 aligned with the side hooks 76 for passage therethrough of the springs.

The lower beams 33 are identical components, one being turned end-to-end horizontally with respect to the other, and similarly with the upper beams 34.

The longitudinal bars 23 can be seen in FIGS. 14 and 15 as having a shallow H-shaped cross-section, each with a shoulder 78 projecting from one side for cooperation with the pawl 53 (FIGS. 13 and 20) as will be described presently, and an anchorage 79 for a wire rope projects from the same side of each bar, these bars being identical components, one being rotated through 180° about its longitudinal axis with respect to the other.

The pairs of toggle links 20, 21 are shown in place on the bars 23 in FIGS. 14 and 15 in their disposition corresponding to the bearers 9, 10, 11, being in their raised, inoperative positions, and reference will now be made to FIGS. 16 to 19 to describe the toggle links in detail and especially to illustrate how the middle pairs are mounted on the bars 23. FIGS. 16 and 17 show that the toggle links 20, 21 are identical components, each being bifurcated to provide two arms 80 with holes 81 for the common pivot 22, one such component being inverted and rotated horizontally with respect to the other, one arm of each link fitting between the arms of the other link at the toggle joint, as shown in FIG. 18, which, together with FIGS. 14, 15 and 19, shows how each bar 23 has a central slot 82 between thickened portions 83 of the sides of the shallow H-section into which slot project one arm of each toggle link of the respective middle pair of links, holes (not visible) in those thickened portions being provided for location of the common pivot 22, with one thickened portion 83 being disposed between the innermost pair of respective arms 80. Similarly, thickened forked ends 84 of the bars 23 accommodate pairs of respective arms 80 of the end pairs of toggle links 20, 21, holes (not visible) being provided in those thickened forked ends for location of the common pivots 22.

All the internal moulded components are preferably made of glass-filled nylon (i.e. nylon reinforced with glass fibres) for lightness with strength, especially rigidity.

Each lever 25, 32 is preferably bifurcated, each thus having a pair of lever arms 27 and the preferred form of linkage consists of eight wire rope runs provided by four lengths of wire rope. Commencing at anchorages 85 (see initially FIG. 20) one on each lever arm of the pedal 25, two wire rope lengths extend as runs 86A to and round pulleys 87 on horizontal transverse axes on the lever arms of the pedal 32 and back as runs 86B to the anchorages 79 on the longitudinal bars 23, while, commencing at anchorages 88 on the lever arms of the pedal 32, the other two wire rope lengths extend as runs 89A to and round pulleys 90 on horizontal transverse axes on the lever arms of the pedal 25 and back as runs 89B to anchorages 91 on the pawls 53 (see FIG. 13).

In FIGS. 21 and 22 one anchorage 85 on a lever arm 27 of the pedal 25 is shown secured to a wire rope run 86A by being crimped on to the end thereof, and having a screwthreaded portion 92 carrying a nut 93 against an abutment 94, the nut being accessible to a tool (not shown) to enable the effective length of the wire rope to be adjusted. These figures also show one of the pulleys 90 between the wire rope runs 89A, 89B, also webs 95 (see also FIG. 8) depending from the platform 1 forming stop means for the pedal in neutral position towards which it is urged by springs 96 (see also FIG. 20) hooked at one end to the lever arms and secured at the other end by screws 97 to cylindrical formations 98 depending from the platform. The same details apply to the anchorages 88 etc. of the pedal 32.

FIGS. 23 and 24, in conjunction with FIGS. 14 and 15, show one of the anchorages 79 on a longitudinal bar 23 as consisting of a rectangular channel 99 leading to an abutment 100 from which extends a bore 101 with a slot 102 at one side, to enable insertion of the end of a wire rope run 86B with a coil compression spring 103 encircling the wire rope and for one end of the spring to abut the inner end 104 of the bore 101 while the other end of the spring abuts a stop member 105 crimped on to the end of the wire rope. FIG. 23 shows the spring 103 fully compressed within the bore 101 so that the stop member 105 is against the abutment 100, thus enabling the wire rope run 86B to pull the bar 23 to the right, as will be described as part of the sequence illustrated by FIGS. 26 to 30.

FIGS. 26 to 30 are limited to those components necessary to show how the wire rope linkage effects the requisite movements of the longitudinal bars 23 in response to depressing of the pedal 25, and reference may also be made to FIGS. 3 to 5, 11 and 12, 21 and 22, and 23 and 24 where appropriate.

Figure 26:
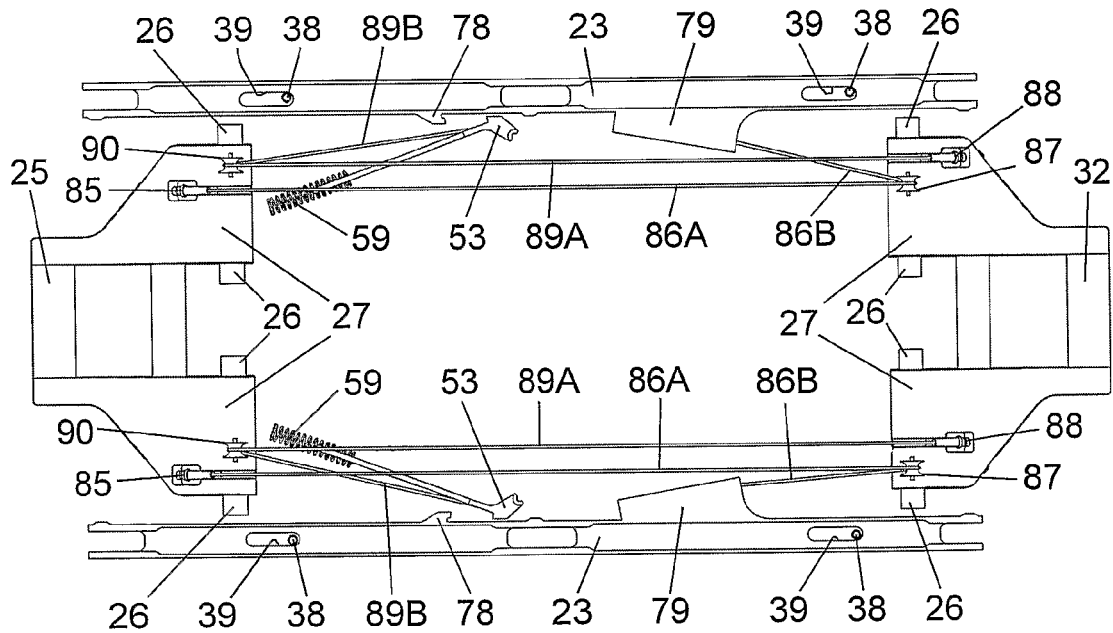
Figure 27:
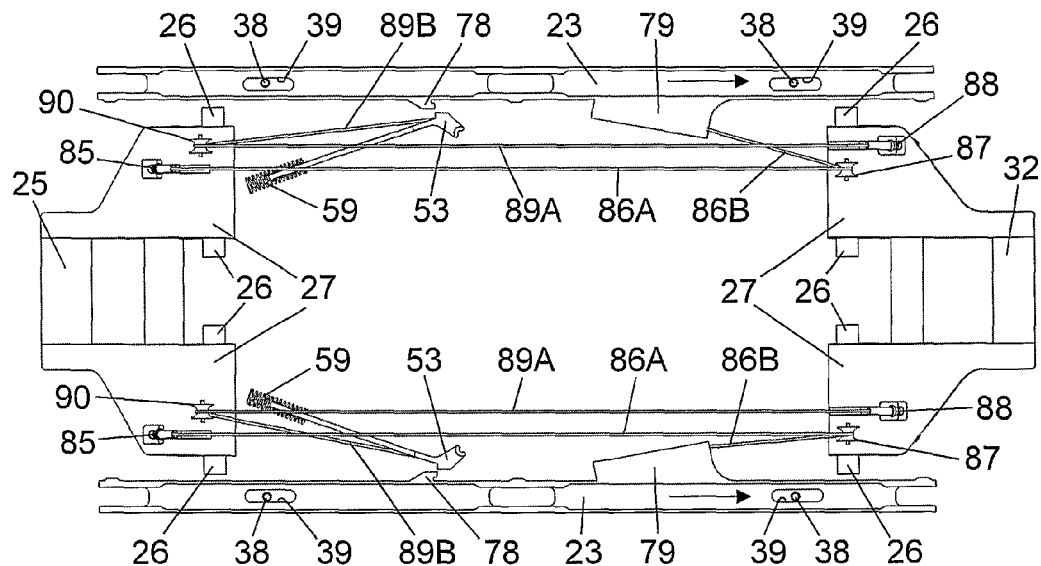
Figure 28:
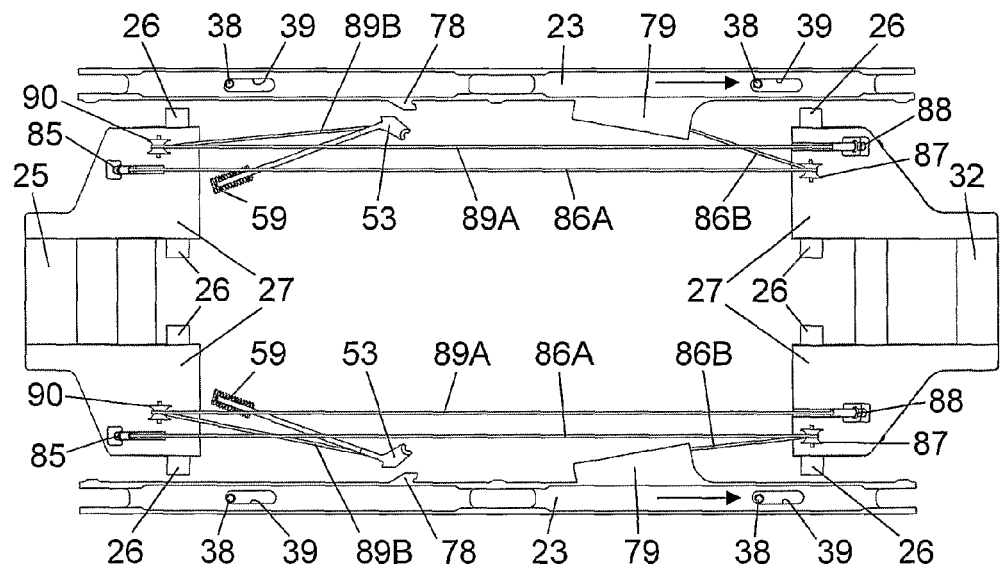

The positions of components in FIG. 26 correspond to the positions of components in FIG. 3 (and see also FIGS. 11 and 21), while positional correspondence also exists between FIG. 27 and FIG. 4, and between FIG. 28 and FIG. 5 (and see also FIGS. 12 and 22).

As the pedal 25 is depressed from the position in FIG. 26 to the position in FIG. 27 (the extent of which can be gauged by the changes in the positions of the anchorages 85 and pulleys 90 relative to the spigots 26 of the pedal) the wire rope runs 86A are increased by pulling some of the runs 86B round the pulleys 87 on the static pulley 32, in consequence of which the anchorages 79 (which are in the state shown in FIG. 23) are pulled to the right and through them also the bars 23, the extent of movement of which can be gauged by the change in the relative positions of the slots 39 in the bars 23 and the guide pins 38 between FIGS. 26 and 27 (compare also FIGS. 3 and 4). Simultaneously, the movement of the pulleys 90 between FIGS. 26 and 27 causes increases in the runs 89A by pulling some of the runs 89B round the pulleys 90 (as the anchorages 88 are static), in consequence of which the pawls 53 are pulled clear of the paths of shoulders 78 moving with the bars 23, guided by the horns 54 following the webs 55, 56.

FIG. 3 shows an initial clearance of the bearers 9, 10, 11 from the floor or ground 24 of 40 mm, and the major movement of the bars 23 takes place between FIGS. 3 and 4 (compare also FIGS. 26 and 27) in bringing the bearers into contact with the floor or ground.

Further depressing of the pedal 25 from the position in FIG. 27 to the position in FIG. 28 (the extent of which can be gauged by the further small changes in the positions of the anchorages 85 and pulleys 90 relative to the spigots 26 of the pedal) causes corresponding further lesser movement of the bars 23 (the extent of which can be gauged by the further small changes in the relative positions of the slots 39 in the bars 23 and the guide pins 38 between FIGS. 27 and 28) to move the toggle links 20, 21 into locked position (see FIG. 5) while lifting the platform 1 to raise the wheels 6,7 off the floor or ground 24, by a minimum of 1.00 mm, and the shoulders 78 on the bars 23 are moved past the further retracted pawls 53.

Figure 29:
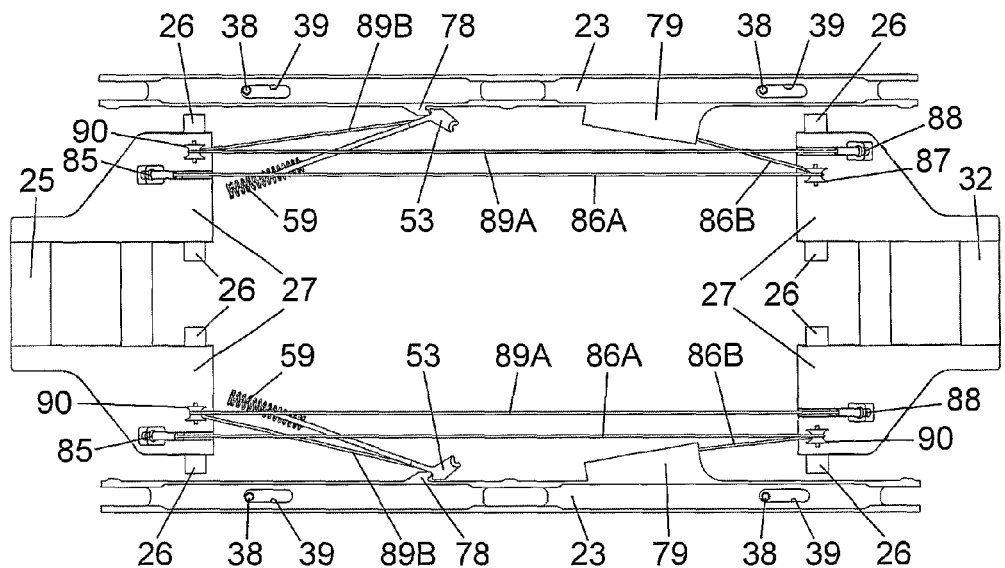

Upon release of the pedal 25 the springs 96 (see FIGS. 20 to 22) pull the pedal 25 back to neutral position (see FIGS. 3, 11 and 21) which allows the pawls 53 to be urged by the springs 59 to pass over the shoulders 78 (again guided by the horns 54 following the webs 55, 56) into the positions shown in FIG. 29, with the springs 59 expanding to take up any slack in the wire rope runs 89A, 89B and the springs 103 in the anchorages 79 expanding (see FIG. 24) to take up any slack in the runs 86A, 86B, in consequence of the bars 23 remaining in the toggle-links-locked positions.

Figure 30:
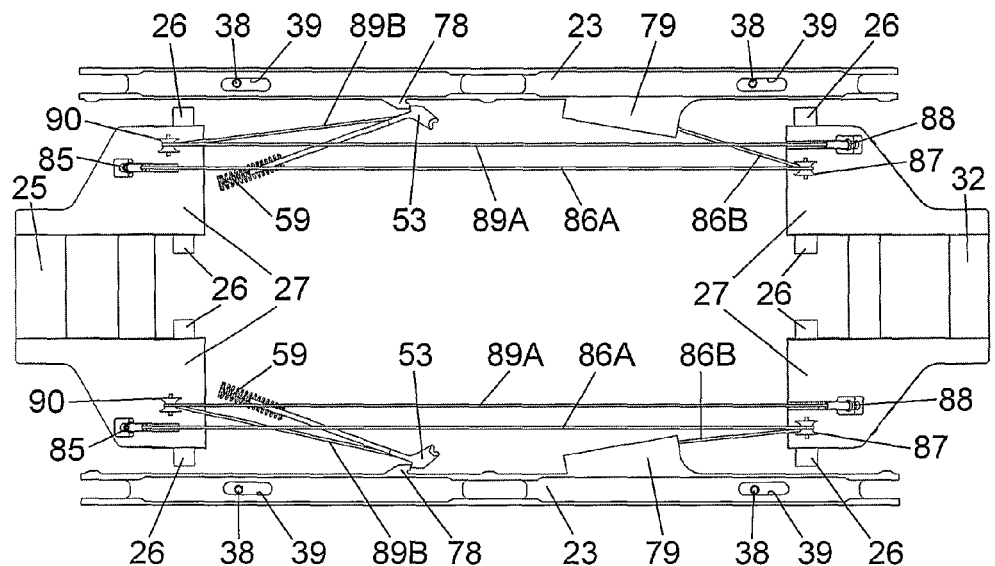

When the toggle links need to be unlocked, to allow the bearers to be returned to inoperative positions by the springs 37, the pedal 25 is depressed briefly from the position shown in FIG. 29 to the position shown in FIG. 30, whereby the pawls 53 are caused to pull the shoulders 78 to move the bars 23 the required short distance to the left, but there is no pull on the bars 23 through the wire rope runs 86A, 86B and the anchorages 79 because the springs 103 in the anchorages become compressed from their state in FIG. 24 to that in FIG. 23 as the bars complete their movements to the left to restore the mechanism to the state shown in FIG. 26 and FIG. 3.

If the pedal 32 is used instead of the pedal 25, the same progressive movements of the bars 23 and the pawls 53 are effected by complementary movements of the wire rope runs 86A, 86B and 89A, 89B by being pulled by the pulleys 87 and the anchorages 88 on the pedal 32 as it is depressed.

Although there are many more components in the preferred embodiment of the invention than in a conventional dolly, the use of polypropylene for the main moulding of the platform, the bearers and their upward extensions, and the cover, and the use of glass-filled nylon for all the internal mouldings, together with the minimising of the metal content to the wire ropes, adjustable anchorages and fixing screws, results in the dolly of the invention being closely comparable in weight to a conventional dolly of the same dimensions and load-bearing capacity, e.g. of the order of 16 kg, thus being equally manually liftable, for which purpose the platform 1 is provided with two openings 106 (see FIGS. 1 and 2) affording access to ribbed handholds 107 (see FIGS. 8 and 20).

In FIGS. 31 and 32 like reference numerals to those in FIGS. 1 and 2 represent like parts, but the version of dolly in FIGS. 31 and 32 varies in that it has only the two bearers 9 and 10 parallel to and adjacent the ends of the platform 1, each with its upward extensions 12, 12 and 13, 13 respectively, the mechanism for lowering and raising these two bearers being the same as described above in relation to the version having three bearers except that, because the middle bearer 11 and its upward extensions 14, 14 have been omitted, the middle pairs of toggle links (20, 21) may also be omitted, thus effecting a further reduction in the total number of components, with consequent saving in expense and also in weight, e.g. by about 1.0 kg in total.

Although the area of contact of the bearers with the floor or ground will be less, the pressure due to the same load as on the version with three bearers will be higher, therefore the frictional force between the dolly and the floor or ground will remain the same. Also in consequence of the middle bearer being omitted, this dolly will lift more easily on uneven surfaces as it will be lifting only in areas directly adjacent the wheels.

Furthermore, the possibility of damage being sustained by side impact will be lessened, particularly as the greater spaces 29A between the bearers 9, 10 at the sides afford easier access for the prongs of a fork-lift truck or other handling equipment.

In describing the alternative form of linkage with reference to FIGS. 33 to 41, it should be noted that these are diagrammatic and that the platform 1 of the dolly and its wheels 6, 7 have been omitted, and that like reference numerals are used to denote the diagrammatic representations of corresponding components in earlier drawings. Relative dispositions of the movable components through the sequence are seen in relation to the floor or ground 24 and/or the upper beams 34. For simplicity, no attempt has been made to include the locking abutments 28 on the toggle links 20, 21, the springs 37 and the guide pins 38 etc., but it is to be assumed that these are included and operate as illustrated and described with reference to FIGS. 3 to 5.

In contrast to the preferred embodiment, the common pivots 22 in FIGS. 33 to 41 by which the middle bearer 11 is suspended are connected by a crossbar 200, four rigid linkbars 201, 202, 203, 204 each have a slot at one end pivotable and slidable on the crossbar, to afford necessary lost motion between the crossbar and the linkbars during the sequence of movements, the other ends of the linkbars being pivoted on shafts 205, 206 carried by pedals 207, 208 respectively at the nearer end and on shafts 209, 210 carried by pedals 211, 212 respectively at the farther end.

The pedals 207, 208 are bifurcated to provide each with a pair of lever arms, and are pivotally mounted between a central bearing 213 and respective side bearings 214, the pedal 207 being on a pivot axis 215 through the 'heels' of its lever arms and the pedal 208 being on a pivot axis 216 through the 'toes' of its pedal arms, while the shaft 205 extends between the 'toes' of the lever arms of the pedal 207 and the shaft 206 extends between the 'heels' of the lever arms of the pedal 208.

Similarly, the pedals 211, 212 are bifurcated to provide each with a pair of lever arms, and are pivotally mounted between a central bearing 217 and respective side bearings 218, the pedal 211 being on a pivot axis 219 through the 'toes' of its lever arms and the pedal 212 being on a pivot axis 220 through the 'heels' of its lever arms, while the shaft 209 extends between the 'heels' of the lever arms of the pedal 211 and the shaft 210 extends between the 'toes' of the lever arms of the pedal 212.

All four pedals 207, 208, 211, 212 are provided with springs (not shown) to return them to the neutral positions shown in FIG. 33 when not depressed by an operator's toe.

When the pedal 207 is depressed (see FIG. 34) the shaft 205 pulls the linkbar 201 as the pedal swings about its axis 215, which in turn pulls the crossbar 200 to move the longitudinal bars 23 in the direction of the arrows, firstly to bring the bearers 9, 10, 11 into contact with the floor or ground 24 as the pairs of toggle links 20, 21 approach their in-line positions (cf. FIG. 4), and, secondly to move them slightly beyond in-line positions (cf FIG. 5) when they become locked (to hold the wheels off the ground), lost motion between the crossbar 200 and the linkbars 202, 203, 204 being allowed by their respective slots. The pedal 207 can then be released and moved back to its neutral position (see FIG. 35) by its return spring, lost motion between the linkbar 201 and the crossbar 200 being allowed by the slot in the linkbar 201.

Figure 36:
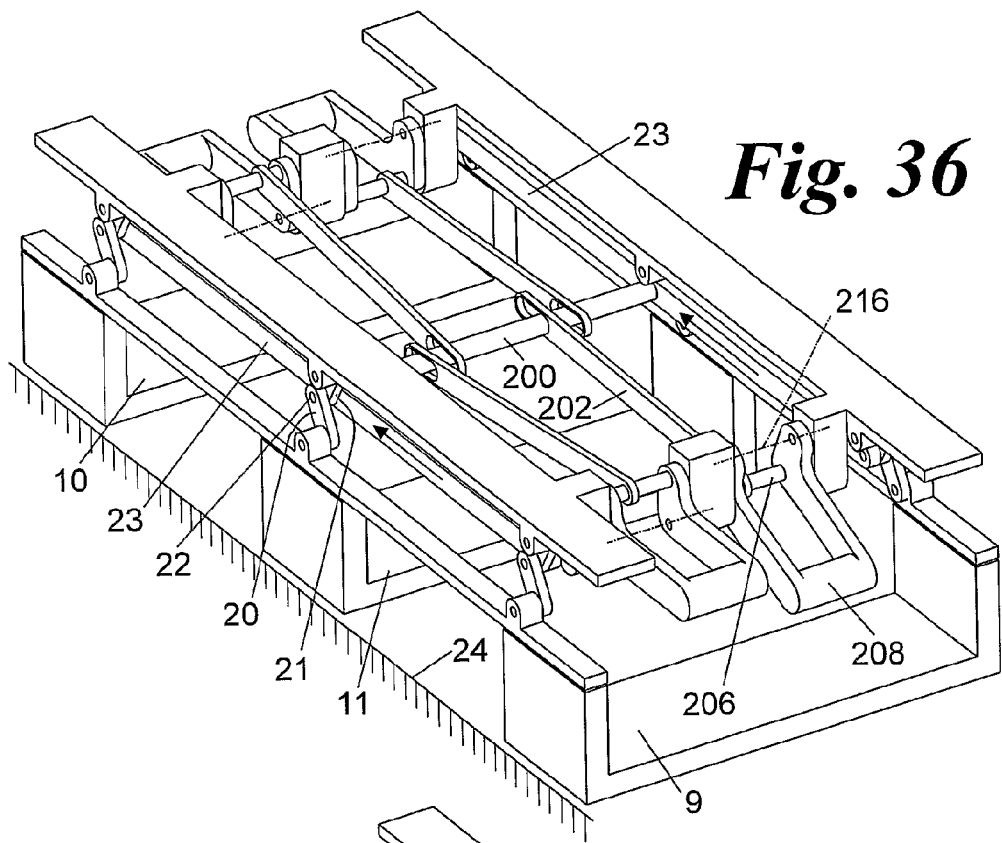
Figure 37:
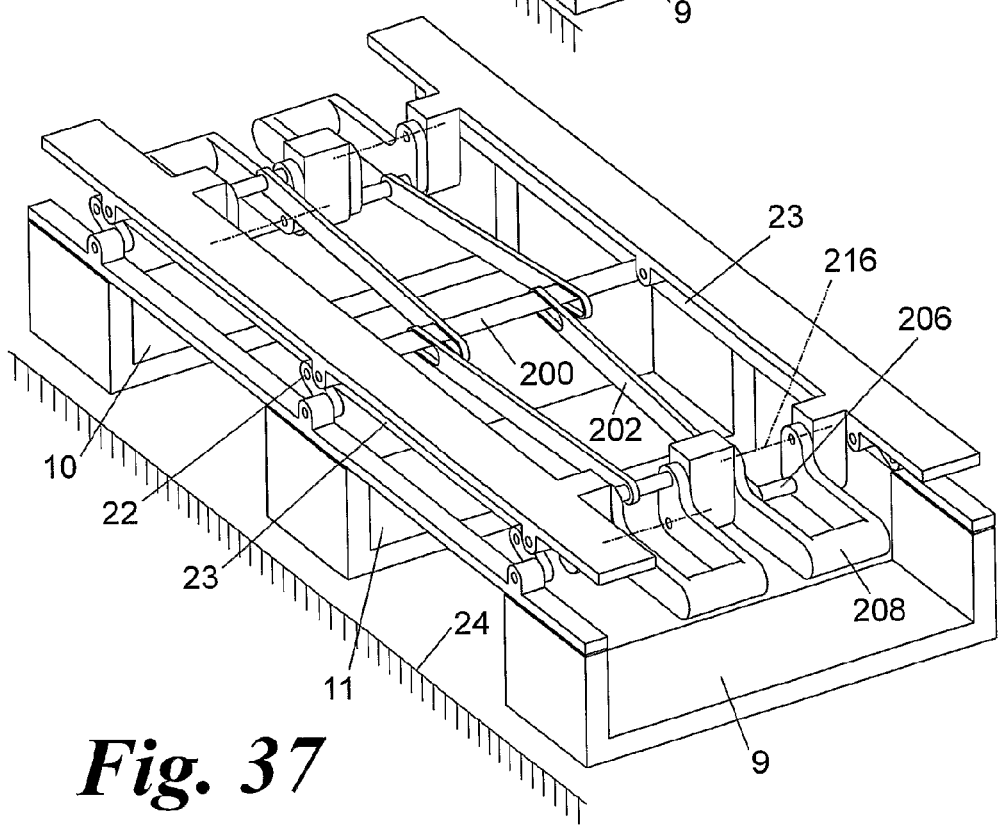
Figure 38:
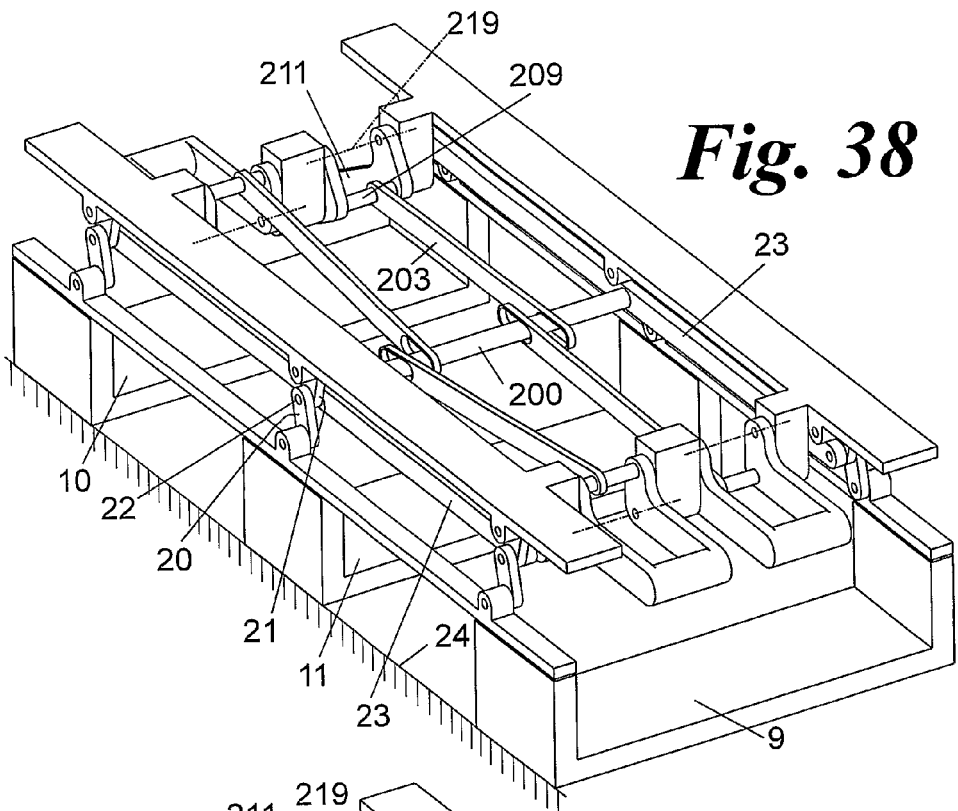
Figure 39:
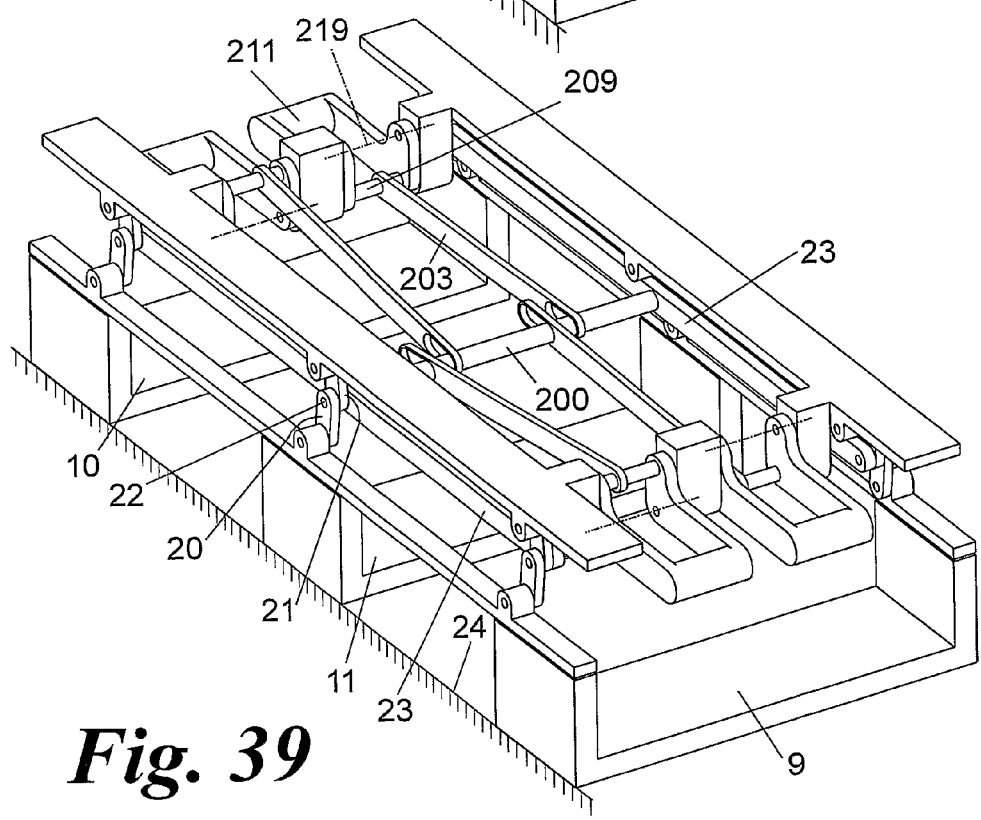

When it is required to unlock the pairs of toggle links, to allow the bearers to be returned to inoperative positions and set the dolly back on its wheels, the pedal 208 is depressed briefly so that the shaft 206 pushes the linkbar 202 as the pedal swings about its axis 216, which in turn pushes the crossbar 200 to move the longitudinal bars 23 in the direction of the arrows in FIG. 36 until the pairs of toggle links have been pushed back through their in-line positions, whereupon the bearers are returned to inoperative positions by the springs 37 and the pedal 208 upon release is moved back to its neutral position (see FIG. 37 identical to FIG. 33) by its return spring, lost motion between the crossbar 200 and the linkbars 201, 202, 203 204 being allowed by the slots in the linkbars.

Alternatively, with an operator at the farther end, the pedal 211 can be depressed (see FIG. 38) so that the shaft 209 pushes the linkbar 203 as the pedal swings about its axis 219, which in turn pushes the crossbar 200 to move the longitudinal bars 23 in the direction of the arrows, firstly to bring the bearers 9, 10, 11 into contact with the floor or ground 24 as the pairs of toggle links 20, 21 approach their in-line positions (cf. FIG. 4), and secondly to move them slightly beyond in-line positions (cf. FIG. 5) when they become locked (to hold the wheels off the ground), lost motion between the crossbar 200 and the linkbars 201, 202, 204 being allowed by their respective slots. The pedal 211 can then be released and moved back to its neutral position (see FIG. 39) by its return spring, lost motion between the linkbar 203 and the crossbar 200 being allowed by the slot in the linkbar 203.

Figure 40:
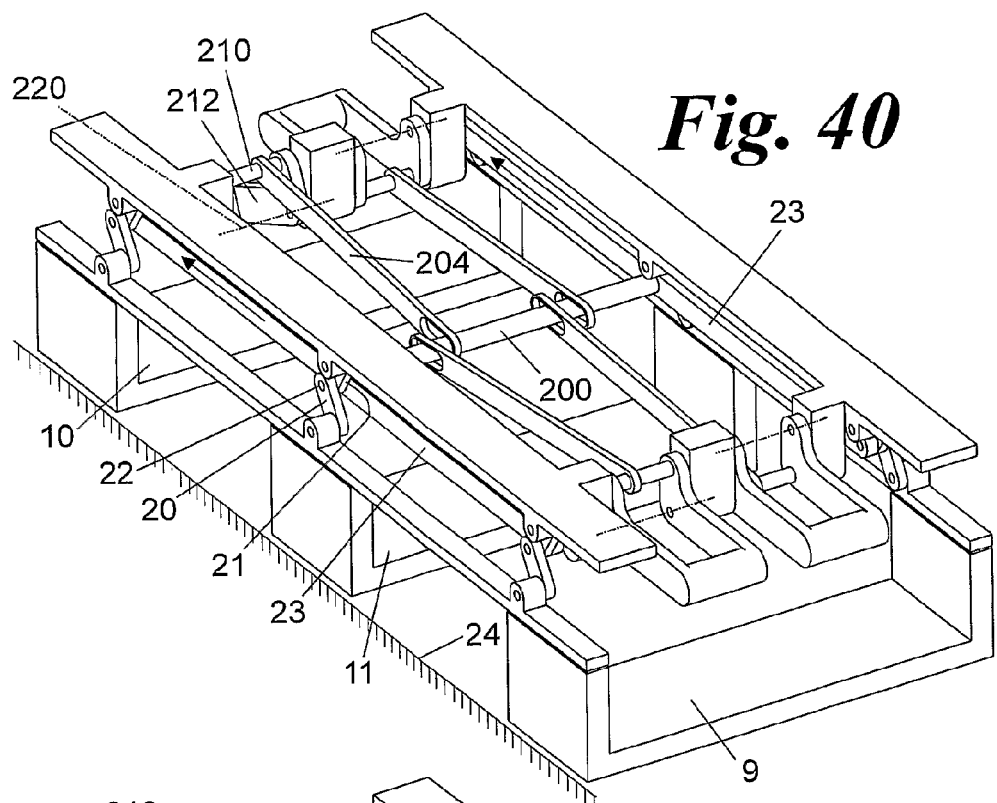
Figure 41:
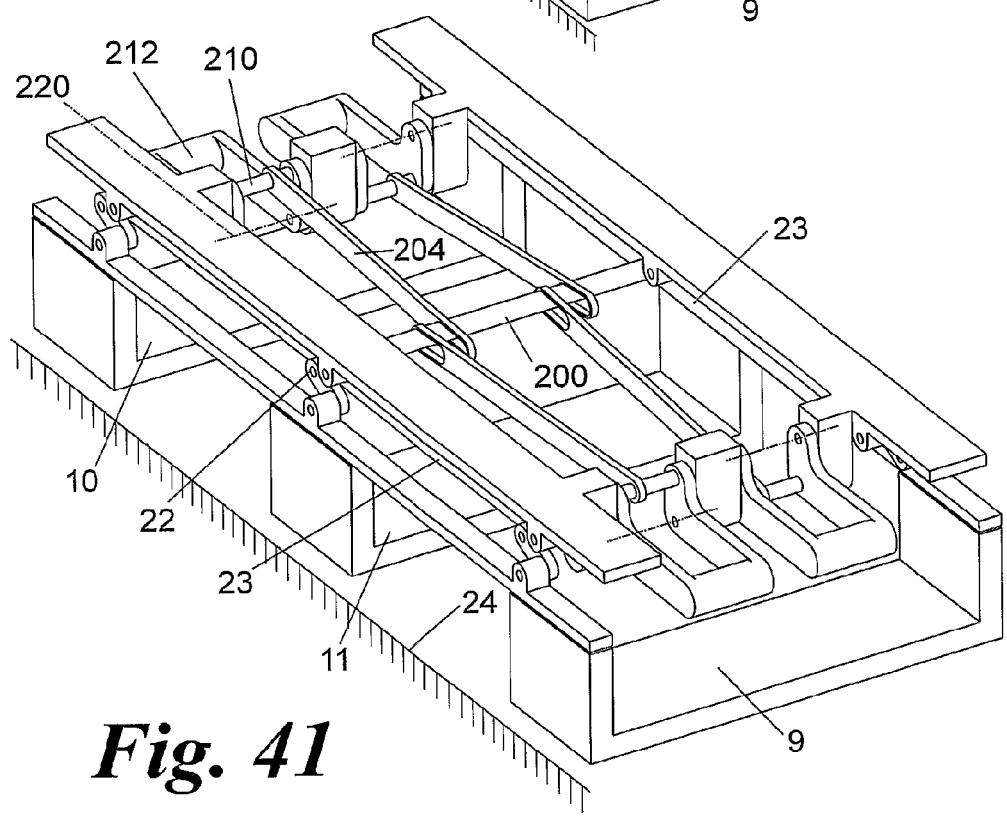

Likewise, when it is required to unlock the pairs of toggle links, to allow the bearers to be returned to inoperative positions and set the dolly back on its wheels, the pedal 212 is depressed briefly so that the shaft 210 pulls the linkbar 204 as the pedal swings about its axis 220, which in turn pulls the crossbar 200 to move the longitudinal bars 23 in the direction of the arrows in FIG. 40 until the pairs of toggle links have been pulled back through their in-line positions, whereupon the bearers are returned to inoperative positions by the springs 37 and the pedal 212 upon release is moved back to its neutral position (see FIG. 41 identical to FIGS. 33 and 37) by its return spring, lost motion between the crossbar 200 and the linkbars 201, 202, 203, 204 being allowed by the slots in the linkbars.

The invention claimed is:

1. A dolly comprising a generally rectangular load-receiving platform having four wheels adjacent its corners, bearers suspended below the platform and adapted to be moved relative to the platform down from and up to inoperative positions, a pedal at each end of the dolly, linkage between each pedal and the bearers whereby upon initial depressing of either pedal the bearers are lowered into engagement with the floor or ground, each of the bearers being suspended by pairs of toggle links arranged to move into substantially in-line positions during final depressing of the pedal to lift the platform and raise the wheels clear of the floor or ground, and each pedal has a lever arm affording a mechanical advantage that is amplified by the mechanical advantage of the toggle links themselves moving into in-line positions, locking means for securing the bearers in floor or ground-engaging positions, and release means activatable to cause raising of the bearers from the floor or ground when the dolly is required to be movable on its wheels, and wherein each pedal has a spring return to a raised neutral position, and the linkage is provided with a change-over system, whereby, after depressing either pedal to bring the bearers into engagement with the floor or ground the bearers are locked in floor or ground-engaging positions while the pedal is allowed to return to its raised neutral position, ready upon subsequent depressing of either pedal to cause reverse movement of the linkage, to unlock the pairs of toggle links and allow spring means to return the bearers to their inoperative positions.

2. A dolly as in claim 1, wherein the locking means comprises shoulders on the toggle links of each pair, the disposition of the shoulders being such that they come into abutment when the toggle links have moved slightly beyond in-line positions.

3. A dolly as in claim 1, wherein longitudinal bars extend from the common pivots of the pairs of toggle links by which one of the bearers is suspended to the common pivots of the pairs of toggle links by which the other bearer or bearers is or are suspended, whereby the latter pairs of toggle links and bearer or bearers become "slave" to the movements of the former pairs of toggle links and bearer.

4. A dolly as in claim 3, wherein each toggle link is bifurcated, one arm of each link fitting between the arms of the other link at the toggle joint with the common pivot, and with the respective longitudinal bar between the innermost pair of respective arms.

5. A dolly as in claim 3, wherein the linkage is connected between the lever arm of each pedal and each of the longitudinal bars extending between the common pivots of the pairs of toggle links.

6. A dolly as in claim 5, wherein each pedal is bifurcated to form two lever arms, each of which is connected by linkage to a respective longitudinal bar extending between the common pivots of the pairs of toggle links.

7. A dolly as in claim 5, wherein the linkage comprises wire rope runs, with one run from each lever arm or each side of the lever arm of each pedal secured to the respective longitudinal bar, there also being another run from each lever arm or each side of the lever arm to release means for the pairs of toggle links coupled by the longitudinal bar, and each release means comprises a spring-loaded reciprocable and deflectable pawl adapted to engage a shoulder on the respective longitudinal bar upon alternate depressings of the pedal to pull the longitudinal bar in the opposite direction to that for lowering the bearers, there being reversal of one of the runs on each side round a pulley on each lever arm or each side of the lever arm of the other pedal to effect the change-over of the direction of movement of the respective longitudinal bar, and the extent of depressing of either pedal for effecting pulling of each longitudinal bar through the respective pawl when engaged with its shoulder being appreciably less than for effecting movement of the pairs of toggle links into in-line positions.

8. A dolly as in claim 7, wherein eight wire runs are provided by four lengths of wire rope, with, at each side of the lever arm or each lever arm of each pedal, an anchorage for a wire rope length extending to and round a pulley on a horizontal axis on the lever arm or respective lever arm of the other pedal and back to an anchorage on the longitudinal bar or to an anchorage on the pawl of the release means respectively.

9. A dolly as in claim 8, wherein each anchorage at each pedal includes adjustment means, for adjustment of the length of the respective wire, both initially and, if necessary during maintenance.

10. A dolly as in claim 9, wherein each adjustment means comprises a screw or nut accessible to a tool from the respective end of the dolly.

11. A dolly as in claim 9, wherein spring means is incorporated in an anchorage of each wire rope length to the respective longitudinal bar to take up slack in the respective wire rope run during return of the respective pedal to neutral position, while the spring-loading of each pawl takes up slack of the respective wire rope length during return of the respective pedal to neutral position.

12. A dolly as in claim 1, wherein the dolly platform is moulded in plastics integrally with skirt portions round the sides and a formation of depending stiffening webs forming spaces to accommodate the linkage.

13. A dolly as in claim 12, wherein each pedal is accommodated wholly beneath the platform in a space also defined by depending stiffening webs, and an opening is provided in the adjacent skirt portion to afford access by the toe of an operator's boot or shoe.

14. A dolly as in claim 12, wherein the depth of some of the stiffening webs is such that the lower edges of these webs will be engaged by the prongs of a fork-lift truck rather than the linkage.

15. A dolly as in claim 12, wherein a cover for at least parts of the spaces accommodating the linkage provides greater areas for engagement by the prongs of a fork-lift truck than the lower edges of some webs alone.

16. A dolly as in claim 15, wherein the cover has upstanding formations complementary to formations depending from the platform forming bearings for stub pivots of the pedals.

17. A dolly as in claim 1, wherein two bearers extend parallel to and adjacent the smaller sides of the platform.

18. A dolly as in claim 17, wherein integral upward extensions at the ends of each bearer are guided for vertical movement in spaces between the stiffening webs and skirt portions, and with vertical channels with open upper and lower ends provided in bearers adjacent the smaller sides of the platform and their upward extensions, to accommodate the wheels, which have mountings permanently secured to the underside of the platform.

19. A dolly as in claim 18, wherein spaces between the bearers and between the upward extensions of the bearers afford access for the prongs of a fork-lift truck.

20. A dolly as in claim 18, wherein the bearers and their upward extensions are incorporated in a single moulding.

21. A dolly as in claim 18, wherein the bearers and their upward extensions are separate mouldings detachably connected to longitudinal beams, to enable any one moulding to be replaced upon becoming damaged.

22. A dolly as in claim 21, wherein the longitudinal beams are in the form of upwardly facing channels, similar longitudinal beams formed by downwardly facing channels being secured along the underside of the platform with upper pivots of the pairs of toggle links disposed between the sides of the downwardly facing channels and lower pivots of the pairs of toggle links disposed between the sides of the upwardly facing channels, and with tension springs connected between the beams to effect return of the bearers to their inoperative positions.

23. A dolly as in claim 22, wherein guide pins depend from the upper beams and are a sliding fit in holes in the lower beams.

24. A dolly as in claim 1, wherein there are three bearers, one between each respective pair of corners of the platform and one intermediate of the longer sides.

* * * * *